United States Patent
Thunuguntla et al.

(10) Patent No.: US 11,556,566 B1
(45) Date of Patent: Jan. 17, 2023

(54) PROCESSING OF COMPUTER READABLE TABLES IN A DATALAKE

(71) Applicant: Intuit Inc., Mountain View, CA (US)

(72) Inventors: Saikiran Sri Thunuguntla, Bangalore (IN); Sirsha Chatterjee, West Bengal (IN); Anishkumar Ss, Chennai (IN); Sidharth Kumar, Chennai (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/709,602

(22) Filed: Mar. 31, 2022

(51) Int. Cl.
*G06F 16/28* (2019.01)
*G06F 16/22* (2019.01)

(52) U.S. Cl.
CPC ........ *G06F 16/285* (2019.01); *G06F 16/2282* (2019.01)

(58) Field of Classification Search
None
See application file for complete search history.

(56) References Cited

U.S. PATENT DOCUMENTS

| | | | |
|---|---|---|---|
| 10,545,960 B1* | 1/2020 | Zhu | G06F 16/2282 |
| 2006/0153457 A1* | 7/2006 | Nakamura | G06K 9/6271 |
| | | | 707/E17.02 |
| 2007/0239744 A1* | 10/2007 | Bruno | G06F 16/22 |
| 2018/0096000 A1* | 4/2018 | Harrison | G06F 16/288 |
| 2020/0380379 A1* | 12/2020 | Tatti | G06N 5/025 |
| 2021/0011949 A1* | 1/2021 | Miyata | G06F 16/35 |
| 2021/0294817 A1* | 9/2021 | Neerju | G06F 16/221 |
| 2021/0342319 A1* | 11/2021 | Agarwal | G06F 16/215 |

* cited by examiner

*Primary Examiner* — Robert W Beausoliel, Jr.
*Assistant Examiner* — Cheryl M Shechtman
(74) *Attorney, Agent, or Firm* — Paradice & Li LLP

(57) ABSTRACT

Systems and methods for identifying one or more master tables of a datalake are described. A system may obtain a plurality of computer readable tables of a datalake (with each computer readable table including one or more features). The system may also group the plurality of computer readable tables into a plurality of groups based on a number of features of each computer readable table of the plurality of computer readable tables. The system may further generate, for each of one or more groups of the plurality of groups, one or more neighborhoods based on a similarity of features between computer readable tables of the group. The system may also identify, for each neighborhood, one or more master tables from the one or more computer readable tables of the group. The system may further provide an indication of one or more master tables identified in the datalake.

20 Claims, 7 Drawing Sheets

US 11,556,566 B1

PROCESSING OF COMPUTER READABLE TABLES IN A DATALAKE

TECHNICAL FIELD

This disclosure relates generally to the processing of computer readable tables in datalakes, including the automatic identification and indication of master tables within the datalake.

DESCRIPTION OF RELATED ART

Many companies and other entities use a datalake (also referred to as a data lake), which is a central repository for storing structured and unstructured data. For example, all electronic files and computer-implemented objects for a company's network may be stored in a datalake for employees and others to obtain and use as necessary. Datalakes may be large in size and include hundreds of thousands or even more objects. Because of the sheer size of datalakes, there is a need to effectively manage and process such objects in a datalake.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for processing computer readable tables in a datalake. The example method includes obtaining a plurality of computer readable tables of a datalake (with each computer readable table including one or more features). The example method also includes grouping the plurality of computer readable tables into a plurality of groups based on a number of features of each computer readable table of the plurality of computer readable tables. The example method further includes, for each of one or more groups of the plurality of groups, generating one or more neighborhoods based on a similarity of features between computer readable tables of the group. Each neighborhood includes one or more computer readable tables of the group. The method also includes, for each neighborhood, identifying one or more master tables from the one or more computer readable tables of the group. The method further includes providing an indication of one or more master tables identified in the datalake.

Another innovative aspect of the subject matter described in this disclosure can be implemented in a system for processing computer readable tables in a datalake. An example system includes one or more processors and a memory storing instructions that, when executed by the one or more processors, cause the system to perform operations. The operations include obtaining a plurality of computer readable tables of a datalake (with each computer readable table including one or more features). The operations also include grouping the plurality of computer readable tables into a plurality of groups based on a number of features of each computer readable table of the plurality of computer readable tables. The operations further include, for each of one or more groups of the plurality of groups, generating one or more neighborhoods based on a similarity of features between computer readable tables of the group. Each neighborhood includes one or more computer readable tables of the group. The operations also include, for each neighborhood, identifying one or more master tables from the one or more computer readable tables of the group. The operations further include providing an indication of one or more master tables identified in the datalake.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
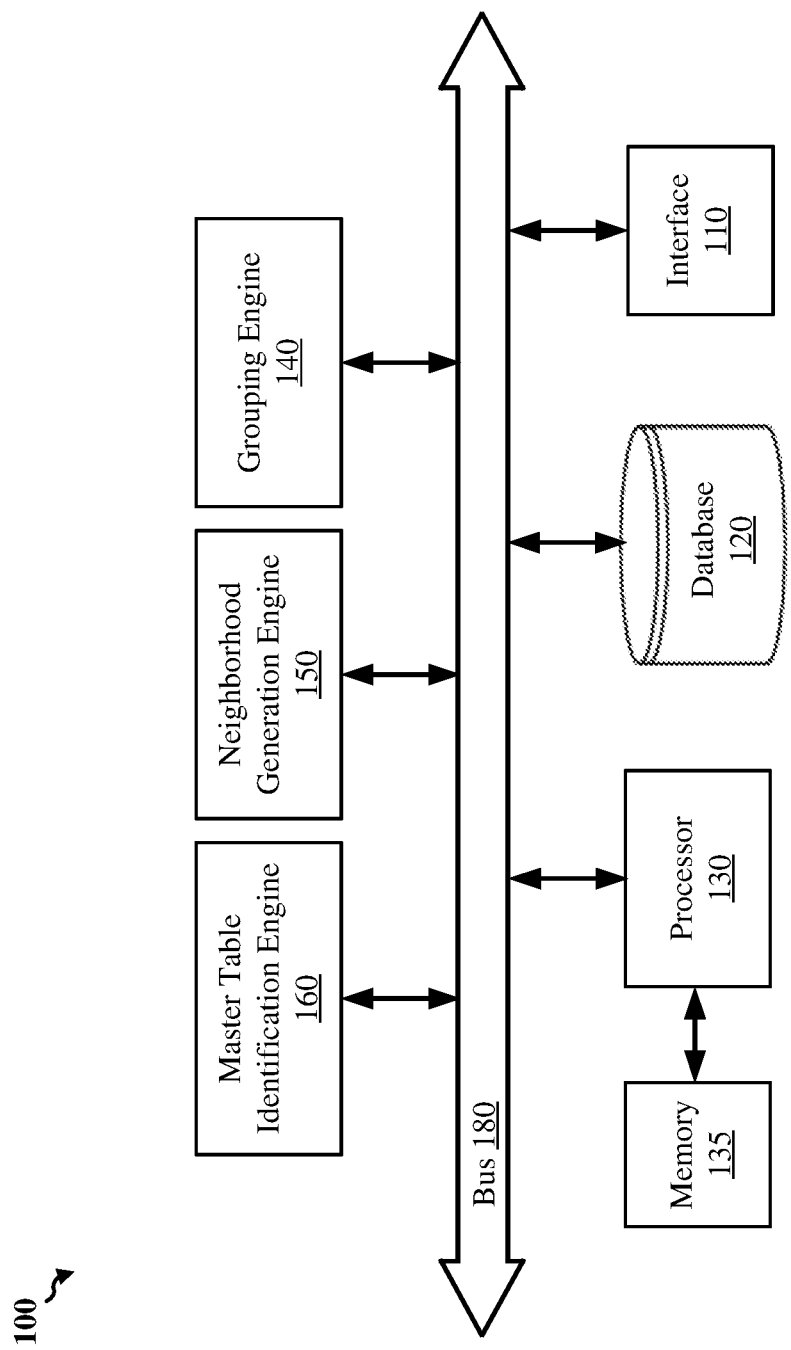
FIG. 1 shows an example system for processing computer readable tables in a datalake, according to some implementations.

Implementations of the subject matter described in this disclosure may be used for the processing of computer readable tables in datalakes, such as the automatic identification and indication of master tables within the datalake.

Data stored in a datalake may be stored in tabular form (which may be referred to as a "computer readable table" or "table" for short). For example, a company that provides an online service to a plurality of users may store information regarding the users or the service's operations for such users in a computer readable table. In a specific example, Intuit® provides an online accounting software package called Quickbooks® Online (QBO). Each transaction using QBO may be stored in the datalake as structured query language (SQL) searchable objects. For example, a payment made by a user using QBO may cause the generation of an object indicating the payer, the payee, the amount, tax information regarding the payment, and other information. The stored objects may be used to generate the computer readable tables, such as a computer readable table to indicate taxes paid across the plurality of payments for a period of time for one or more users. Other types of tables for different types of services may be from user interaction statistics with an online streaming platform (such as number of logins, total amount of time used, etc. for a plurality of users), user account information for users of an online service (such as length of membership, type of membership, etc. for a plurality of users), error information regarding operation of a service (such as number of specific errors, time of the error, actions taken in result of the error, etc.), and so on. As such, a computer readable table as used herein is not limited to a specific type of table or a specific type of service for which the table is associated.

Each table may include rows and columns to organize different features. Each row may be associated with a different user or other unit for measurement, such as different days, different markets, etc. in which to break down the features. Each column may be associated with a specific feature of interest, such as a user identification (ID), invoice amounts, taxes paid, amount of time using a service, error occurrence, error type, etc.

An employee or other person may wish to analyze specific data associated with the service. For example, an employee may wish to analyze the data regarding total taxes paid and other accounting information for different users, different geographical regions, or for other units of measure. As such, the employee may use a software tool to aggregate the relevant data in the datalake to generate a table including the features of interest to the employee, and the table is analyzed by the employee. The table is also stored in the datalake. Various analysis of the data may require different features. For example, the employee using the previously generated table may determine that a different set of features is needed and as such the table needs to be amended. The software tool may remove or add columns to the table (or otherwise amend the table) based on the different set of features needed in order to generate an updated table. The updated table is also stored in the datalake.

Because of the amount of time and manual resources required to generate a brand new table including specific features, many tables are generated using a previously generated table. For example, a handful of original tables (which may be referred to as master tables) are used to generate other tables (which in turn may also be used to generate additional tables). As more and more tables are generated over time, keeping track of the master tables may be difficult in the sheer number of tables in the datalake. As a result, a person may need to spend more and more time searching for a master table of interest. For example, a datalake may include hundreds of thousands (or even more) computer readable tables, with the hundreds of thousands of computer readable tables including thirty or forty master tables. In addition, even determining neighborhoods of related tables (such as being based off of the same master table), much less identifying the master table of the neighborhood, becomes more and more difficult as the number of tables stored in the datalake grows.

Many companies attempt to allay issues with determining neighborhoods and identifying master tables by requiring notes to be manually entered and naming conventions to be manually observed by the people causing the tables to be generated. For example, a specific file name nomenclature and note taking may be required by a company for people to indicate the lineage of a table. However, such requirements may be prone to human error and require trust in that everyone adheres to such requirements. As a result, many tables may have the same name or a name that in no way indicates its relationship to another table. In addition, while some tables may include notes, many tables may not include such notes to indicate lineage. As a result, there is a need for the automatic processing of computer readable tables to generate neighborhoods of related tables and identify the master tables of such neighborhoods.

Various implementations of the subject matter disclosed herein provide one or more technical solutions to the technical problem of processing computer readable tables of a datalake to identify master tables. In some implementations, a system is configured to obtain a plurality of computer readable tables of a datalake (with each table including one or more features), group the plurality of computer readable tables into a plurality of groups based on number of features, generate one or more neighborhoods based on a similarity of features between tables for each group of tables, and identify a master table for each neighborhood. The system may indicate the identified master tables, which may be used to track the tables of most interest to others for analysis or to generate additional tables.

Various aspects of the present disclosure provide a unique computing solution to a unique computing problem that did not exist prior to the use of datalakes and enormous amounts of computer readable data being stored. Processing and converting hundreds of thousands, or even millions, of computer readable tables cannot be performed in the human mind, much less using pen and paper. As such, implementations of the subject matter disclosed herein are not an abstract idea such as organizing human activity or a mental process that can be performed in the human mind.

FIG. 1 shows an example system 100 for processing computer readable tables in a datalake, according to some implementations. The system 100 includes an interface 110, a database 120, a processor 130, a memory 135 coupled to the processor 130, a grouping engine 140, a neighborhood generation engine 150, and a master table identification engine 160. In some implementations, the various components of the system 100 may be interconnected by at least a data bus 180, as depicted in the example of FIG. 1. In other implementations, the various components of the system 100 may be interconnected using other suitable signal routing resources.

The interface 110 may be one or more input/output (I/O) interface to communicate with a datalake, including accessing and obtaining computer readable tables of the datalake for processing. The interface 110 may also be used to provide an indication of one or more master tables identified by the system 100. The interface 110 may also be used to provide or receive other suitable information, such as obtaining computer code for updating one or more programs stored on the system 100, providing an indication of one or more neighborhoods generated by the system 100, providing notes associated with a computer readable table regarding the computer readable table's lineage, providing a confidence in an identification of a master table, and so on. An example interface may include a wired interface or wireless interface to the internet or other means to communicably couple with other devices, such as a datalake, user devices, and so on. For example, the interface 110 may include an interface with an ethernet cable to an internal network for a company or other entity. Additionally or alternatively, the ethernet cable may be coupled to a modem, which is used to communicate with an internet service provider (ISP) directing traffic to and from other devices. As such, the interface 110 may be used to communicate with another device within the internal network or via the internet to which the system 100 is coupled. As used herein for a system 100 remote to a user, communicating with a "user" (such as providing an indication of a master table) may refer to communicating with the user's device (such as a smartphone, tablet, personal computer, or other suitable electronic device). For example, the system 100 may be a server to which an employee's personal computer is coupled, and a user may cause the server to perform operations to identify one or more master tables. In some implementations, the interface 110 may include a display, a speaker, a mouse, a keyboard, or other suitable input or output elements that allow interfacing with the system 100 by a local user. For example, the system 100 may be a personal computer or another suitable device from which operations may be performed to identify one or more master tables.

To note, obtaining a computer readable table may refer to retrieving the computer readable table itself (or a copy of the computer readable table) or obtaining information regarding the computer readable table of the datalake. For example, the computer readable table may remain stored in the datalake, while entries in the table or other information regarding the table are obtained via the interface 110. Such information retrieved via the interface 110 is then used to identify the master tables residing in the datalake.

As noted above, the system 100 may be coupled to a datalake. The datalake may be implemented in any suitable manner to be a large repository for computer readable data for an entity. In some implementations, the datalake may be implemented centrally in one or more servers of a company to host files for the entire company. In some other implementations, the datalake may be distributed across a plurality of devices, with software used to manage the distributed nature of the datalake. For example, Apache Hadoop provided by the Apache Software Foundation may be used to manage a distributed datalake across a plurality of systems, and Apache Atlas provided by the Apache Software Foundation may be used as an interface (which may include a graphical user interface (GUI), such as through interface 110) for a user of the system 100 to interface with the datalake. In some implementations, the computer readable tables stored on the datalake may be generated using Apache Hive provided by the Apache Software Foundation (with such tables also being referred to as Hive tables). While some example implementations of a datalake and computer readable tables stored in the datalake are provided, the datalake and computer readable tables may be implemented in any suitable manner and may be in any suitable format to meet the needs of the company or entity using the datalake.

The database 120 may store the obtained computer readable tables, any outputs of the components 140-160, or other information to be used for the operation of the system 100. In some implementations, the database 120 may include a relational database capable of presenting information regarding the computer readable tables in tabular form and capable of manipulating such information using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

In one or more implementations, the processor 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

To identify one or more master tables from the obtained computer readable tables, the system 100 is to generate neighborhoods of related tables and then identify the master tables in the generated neighborhoods. For example, if a first master table is associated with a first hundred computer readable tables (being the first table from which the hundred tables directly or indirectly were generated) and a second master table is associated with a second hundred computer readable tables, the first hundred tables would be a first neighborhood of related tables and the second hundred tables would be a second neighborhood of related tables (with the neighborhoods being exclusive of each other). If the neighborhoods are known, each neighborhood may be analyzed to identify the master table of the neighborhood. As such, the system 100 (such as components 140 and 150) generates the neighborhoods in order to be able to identify one or more master tables based on the generated neighborhoods.

The grouping engine 140 may group the computer readable tables into one or more groups based on a number of features of the computer readable tables in order to generate the one or more neighborhoods. As noted above, the interface 110 may obtain a plurality of computer readable tables of a datalake, and each computer readable table includes one or more features. For example, each computer readable table may include a number of columns, with each of the one or more features of the computer readable table being represented in a column. Related tables associated with a master table are assumed to have a similar number of features. As such, the grouping engine 140 may place the tables into groups based on the number of features of a table in order to limit the tables that may be included in a specific neighborhood.

If each feature is associated with a column of a table, comparing the number of features may be based on comparing the number of columns between tables. In some implementations, it is assumed that two tables with a similar number of columns corresponds to the two tables having a similar number of features (such as a number of columns between tables being within a threshold amount of each other corresponds to the two tables having a number of features within a tolerance of each other). Conversely, two tables with a large difference in number of columns may not correspond to each other since the difference in number of features is greater than a tolerance. Practically speaking, in comparing a table made from a master table and the master table itself, or two tables that descend from the same master table, the two tables should have a similar number of columns (if a column represents a feature). The number of columns may not be exactly the same since some features may be added or removed for the specific purpose of the table, but the changes in the feature set should be kept to a defined maximum for the tables to still be related. For example, if a first table includes 45 columns and a second table includes 145 columns, there would not be much similarity between the two tables since the second table is associated with at least 100 more or different features than the first table. To note, the tolerance that may occur in number of features or columns between tables for tables to still be grouped together may be any suitable value. For example, the tolerance may be predefined, may be configured for a specific company or entity, or may be used configurable. In some implementations, the tolerance between tables may be variable and based on binning the tables into specific bins based on column size, and the tables in a bin may be used in generating a neighborhood. As such, the following examples in describing grouping tables are provided as examples exclusively for clarity in explaining aspects of the present disclosure. In addition, while the examples describe grouping tables with reference to number of columns for clarity, any suitable means for grouping tables based on number of features may be used.

In some implementations, the grouping engine 140 grouping a plurality of computer readable tables into a plurality of groups includes binning each of the plurality of computer readable tables into a bin of a plurality of bins, with each bin of the plurality of bins corresponding to a range of number of columns. For example, the plurality of bins may include a bin 1 for tables with 1-20 number of columns, a bin 2 for tables with 21-40 number of columns, a bin 3 for tables with 41-60 number of columns, and so on. If a first table includes 80 columns, the first table would be binned into bin 4. If a second table includes 39 columns, the second table would be binned into bin 2. After binning, the system 100 may generate a neighborhood from the tables of a bin and exclude tables from other bins. In this manner, a table with 2 columns may be compared in similarity to tables with 1 to 20 columns while not being compared to tables with more than 20 columns.

To be able to compare tables with a different number of columns that fall within the same bin, tables in a bin may be adjusted to have the same number of columns. In some implementations, the grouping engine 140 may zero pad tables with less columns than the maximum number of columns for a bin so that all tables in a bin include the same number of columns. For example, for a bin 1 for tables with 1-20 columns, the grouping engine 140 may zero pad tables in the bin with less than 20 columns to ensure each table includes 20 columns. Zero padding may include adding a zero for a column entry or adding a null data type for the column entry. In some other implementations, padding may be any suitable means other than zero padding (such as including an unused data type for columns being added to a table).

In some implementations, binning using a plurality of bins may be sufficient to group the tables in order to generate the neighborhoods. However, as can be seen in the above example, tables near the division mark for number of columns may not be compared to each other if separated into different bins. For example, a first table with 19 columns would not be compared to a second table with 21 columns to determine if the two tables are similar. In some implementations other than using one set of bins, a user or company may desire a second plurality of bins (with each bin corresponding two a second range of number of columns) or additional pluralities of bins to also be used to bin the same plurality of tables. In this manner, the grouping engine 140 may bin a first table into a bin from a first plurality of bins and into a bin from a second plurality of bins. The ranges of the first plurality of bins and the second plurality of bins may overlap without being the same in order to cover the corner case of tables near the demarcation line of number of columns between bins in the first plurality of bins. For example, with a first plurality of bins including a bin 1 for tables with 1-20 columns, a bin 2 for tables with 21-40 columns, and so on, a second plurality of bins may include a bin 1a for tables with 1-10 columns, a bin 2a for tables with 11-30 columns, a bin 3a for tables with 31-50 columns, and so on. In this manner, the grouping engine 140 may bin a table with 39 columns into bin 2 of the first plurality of tables and into bin 3a of the second plurality of tables. A table in a first bin in the first plurality of bins and in a second bin in the second plurality of bins may be compared to other tables in the first bin and may be compared to other tables in the second bin. In some implementations, and as described in more detail, neighborhoods may be generated for the different bins, and the neighborhoods may be merged for specific overlapping bins.

While the range of columns for the bins is depicted as a uniform progression of 20 columns for clarity, the range may be any suitable size or may differ in size. For example, for tables with less than 100 columns, the bins may have a range of 10 columns. For tables with greater than 100 columns, the bins may have a range of 20 columns. In practical terms, a table with 20 columns is likely to be less similar to a table with 1 column than a table with 120 columns being compared to a table with 101 columns because the same difference of 19 columns has a larger effect on the table with the fewer number of columns. As such, the bins may be defined to increase in size as the number of columns increase. However, the ranges of the bins, the overlap of different sets of bins, the number of different sets of bins to be used (such as three or more pluralities of bins), and so on may be configured as suitable for a user or entity.

Regarding the comparison of tables to one another, to be able to compare tables or perform other operations in generating neighborhoods, the system 100 may process each table to generate a vector for the table. For example, with each of the one or more features of a table being represented in a column of the table, each column may include a column name. The system 100 may generate a vector associated with the table based on the column names. For example, a table typically includes entries in a first row that indicates a name of each column or otherwise what data the column entries are to include for latter rows. The system 100 may generate a vector based on such names or indications for the one or more columns, such as by providing the names to a text to vectorizer model to convert the names into a number vector (such as into a binary vector). In some implementations of zero padding a table, the associated vector may be zero padded to include one or more zeros to ensure the number of digits of the vectors are the same for all tables in a bin. Any suitable means of generating vectors may be used. For example, a text to vector software may be executed by the system 100 to convert tables to vectors, such as software implementing the word2vec algorithm, the countvectorizer( ) model, or the tf-idf vectorizer model. In some implementations, the vectors may be previously generated and stored in the datalake. As such, obtaining the plurality of tables by the system 100 from the datalake may include the system 100 obtaining the plurality of vectors associated with the tables from the datalake.

In generating a vector, the names of the columns are values in a set to be arranged for the vector. For example, if a table has n columns associated with n features (for integer n greater than zero) and the names of the columns (such as the entry of the first row for each column of the table) are generically "column 1", "column 2", and so on to "column n" (with "column x" for integer x from 1 to n being any type of name, such as a character string, a number, etc.), the vector may be generated by providing the names "column 1", "column 2", and so on to "column n" for conversion using a text to vector software to generate a vector for the table. To note, some text to vector conversions handle the zero padding or other suitable processes to ensure that the vectors are of the same length. In some implementations, the column names may be provided to the text to vector software in the order as they appear from left to right in the associated table. In some other implementations, the column names may be reordered before being converted to a vector. For example, the column names may be reordered based on alphabetical order. In this manner, a table having a later column with a column name that starts with "a" that is after a prior column with a column name that starts with "p" will have the column names reordered before vectorization so that the later column's name precedes the prior column's name.

To note, a column of a table may be associated with a datatype (also referred to as a data type) that is not the same as some other columns of the table. For example, a hive table may include column datatypes of integral types (in which entry values may include integers), string literals (in which entry values may include a string of specific characters indicated using quotations), variable character types (varchar, in which entry values may be a string of different characters of varying length), character types (char, in which entry values may be of different characters of a fixed length), timestamps, dates, intervals (in which entry values may be intervals of time, dates, keywords, or other measurable units), and decimal literals (in which entry values may be decimal numbers). In a specific example, columns 1, 4, and 5 of a hive table may be of a string literal datatype, a column 2 of a hive table may be of a timestamp datatype, a column 3 may be of a decimal datatype, and so on.

In addition to using a name of a column for vectorization, generating a vector from a table may also be associated with a datatype of the column. To be able to generate a vector from a table based on column names and datatypes for the columns of the table, the datatype may be indicated in some text form that is also provided for conversion using the text to vector conversion. In some implementations, the system 100 (or another system that generates the vector) may include an entry for each column of a table to indicate the datatype. In some other implementations, the system 100 (or another system that generates the vector) may concatenate a column name with a datatype associated with a column before providing the column names for vectorization. For example, if the column names for a table (exclusive of the datatypes) is [column1, column2, column3, . . . , columnx], the system 100 may concatenate the names with the datatypes for each column such that the column names inclusive of the datatypes is [column1-datatype1, column2-datatype2, column3-datatype3, . . . , column-datatypex]. To note, any of the datatypes 1-x may be the same or may differ from other datatypes. The 1-x in the above example is to indicate the datatype corresponding to the specific column. After concatenation of the column names and datatypes, the concatenated names and datatypes may be converted to a vector using any suitable word to vector software (such as described above). In some implementations, the concatenated column names and datatypes may be reordered (such as alphabetically) before vectorization. In this manner, two similar tables would have similar column name datatype concatenations vectorized based on a similar order of the concatenated column names and datatypes. To note, the vectors may be in any suitable format. While the below examples are described with reference to binary vectors, the vectors may include other number types or may include non-number values.

The above examples describe column names found within the table entries themselves. However, the column names and datatypes may be identified in any suitable manner for vectorization. For example, the set of column names and the datatypes may be in a separate table (or another suitable form) associated with the table having entries for each column. In another example, the column names and datatypes may be identified from metadata for a table. A set of column names (which may be concatenated with datatypes) may be stored separately and associated with the table. As such, in some implementations of obtaining a plurality of computer readable tables, the interface 110 may obtain the set of column names concatenated with column datatypes associated with a table of data stored in the datalake. Alternatively, the system 100 may generate such a set of column names and datatypes from the tables stored in the datalake and obtained by the interface 110.

Figure 2:
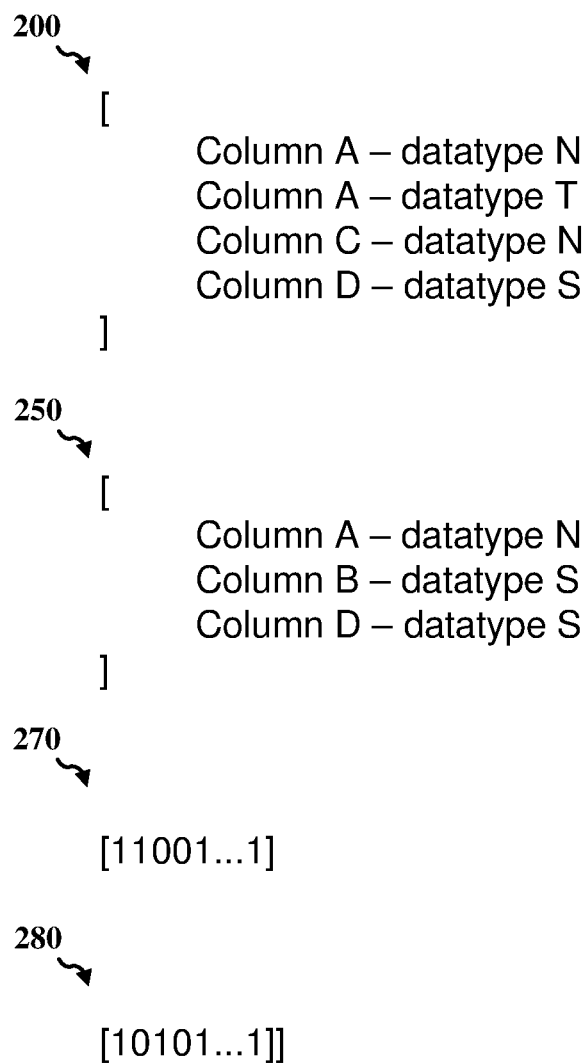
FIG. 2 depicts a simplified example of two example computer readable tables 200 and 250 of column names concatenated with datatypes that are generated from two separate tables in the datalake.

FIG. 2 depicts a simplified example of two computer readable tables 200 and 250 of column names concatenated with datatypes that are generated from two separate tables in the datalake. The tables 200 and 250 may be generated or otherwise obtained by the system 100. For example, if the tables 200 and 250 are previously generated and stored on the datalake, the system 100 may obtain the tables 200 and 250 from the datalake. If the tables 200 and 250 do not exist on the datalake, the system 100 may obtain from the datalake the tables used to generate tables 200 and 250. The system 100 thus may generate the tables 200 and 250 from the obtained tables. In some implementations, the tables 200 and 250 may be JavaScript Object Notation (JSON) objects, hive tables, or other suitable relational tables. In some implementations, the original tables with which tables 200 and 250 are associated may be hive tables or other suitable relational tables. However, the tables 200 and 250 (and the underlying associated tables) may be in any suitable form. As such, "table" as used with reference to 200 and 250 in FIG. 2 may refer to any organized set of column names and datatypes.

While table 200 includes four entries corresponding to four columns of a table and table 250 includes three entries corresponding to three columns of another table in the simplified example, a table may include hundreds, thousands, or even more entries. Generic column names and generic datatype names are used for the columns and datatypes in the simplified example, with the column names being from A-D and the datatypes being from N-T. The tables 200 and 250 are already sorted in alphabetical order, which may be performed in generating the tables 200 and 250 or before generating the vectors 270 and 280 associated with tables 200 and 250, respectively. For example, the sortedset( ) operation may be applied to the tables in the Python programming language ("Python") to sort the table entries alphabetically or based on other sorting criteria.

Vectors 270 and 280 are binary vectors generated from vectorizing the concatenated column names and datatypes for tables 200 and 250, respectively. In some implementations, the system 100 may apply the CountVectorizer( ) operation across all of the sorted tables (such as to tables 200 and 250) using Python to generate the vectors associated with the tables (such as vectors 270 and 280 associated with tables 200 and 250, respectively). In this manner, the system 100 may generate a binary vector. While CountVectorizer( ) is described for conversion, other software or suitable modules for conversion may be used, such as word2vec or the Tf-idf Vectorizer.

Regarding grouping the tables (such as tables 200 and 250) into one or more groups, the grouping engine 140 groups tables based on the number of columns. For FIG. 2, the number of columns may be associated with the number of entries in the tables 200 and 250. In some implementations, the system 100 may count, for each table, the number of entries appearing in the table, and the total indicates the number of columns. The grouping engine 140 may use the counts to group the tables based on number of columns. As described above with reference to binning tables, the tables may be binned into any plurality of bins (such as a first plurality of bins associated with a first set of range of columns, a second plurality of bins associated with a second set of range of columns, and so on). In the example in FIG. 2, if a bin is associated with both 3 columns and 4 columns (such as a bin associated with a range of columns from 1 to 10), both tables 200 and 250 would be assigned to the same bin. In some implementations, binning the tables may refer to binning the vectors generated from such tables (such as binning the vectors 270 and 280 associated with tables 200 and 250) or otherwise associated the vectors into a group in order to be compared to one another. To note, while generating the vectors is described as being performed before binning (or otherwise grouping) the tables, generating the vectors may occur before, after, or concurrently with grouping the tables into one or more groups. As such, generating the vectors may be performed by the grouping engine 140, the neighborhood engine 150, or any other suitable component of the system 100.

Referring back to FIG. 1, with the grouping engine 140 generating a plurality of groups, the neighborhood generation engine 150 may generate one or more neighborhoods for each of one or more groups of the plurality of groups based on a similarity of features between tables. For example, for tables grouped in a first bin associated with number of columns from 1-20, the neighborhood generation engine 150 may attempt to generate one or more neighborhoods of tables for the first bin based on a similarity of columns between tables. The similarity of the columns between tables is based on the similarity of the vectors between tables. For example, if a first vector is generated for a first table with similar concatenated column names and datatypes as a second table for which a second vector is generated, the first vector and the second vector should be similar.

A similarity of features or columns between two tables may be based on a similarity indication between two vectors associated with the two tables. For example, the neighborhood generation engine 150 may generate a similarity metric between two vectors to indicate the similarity between the associated tables. In this manner, the neighborhood generation engine 150 generating one or more neighborhoods for a group may include the neighborhood generation engine 150 calculating a similarity metric between vectors for one or more pairs of corresponding tables of the group and clustering the one or more tables of the group into one or more neighborhoods based on the calculated similarity metrics.

In some implementations, the similarity metric is a cosine similarity score between two vectors, which is the dot product of two n-dimensional vectors divided by the product of the two vectors' lengths (magnitudes). The cosine similarity between vectors A and B is depicted in equation (1) below:

$$\text{cosine similarity } (A, B) = \frac{A \cdot B}{|A| \times |B|} \quad (1)$$

In an example, the cosine similarity of vectors 270 and 280 includes the dot product of the vectors divided by the cross product of the lengths of the vectors 270 and 280.

Since the vectors may be zero padded or otherwise ensured to be the same length in each group, such a cosine similarity may be used to indicate an angle between the two n-dimensional vectors (which indicates the difference and the similarity between two vectors (and thus two tables)). To note, a cosine similarity of 1 (on a scale from 0 to 1) indicates the two vectors being the same. In some implementations, if the cosine similarity metric is greater than a threshold, the two tables associated with the cosine similarity metric may be considered to be similar/related. Conversely, if the cosine similarity metric is less than the threshold, the two tables may be considered not similar/related. Any suitable threshold may be used, such as 0.9. The threshold may be the same for all groups of tables or may vary based on the group of tables. For example, tables with fewer number of columns (such as from a first bin for the number of columns 1-20) may be associated with a higher threshold while tables with a greater number of columns (such as from a bin for the number of columns 181-200) may be associated with a lower threshold. A threshold may be set or adjusted by a user based on previous analysis of the similarity metrics for various groups, may be predefined for the system 100, or may be determined in any other suitable manner. Any number of thresholds and the means for determining such thresholds may be used, and the present disclosure is not limited to a specific threshold or means of determining a threshold. While a cosine similarity metric between vectors is described as an example metric of the similarity between tables, any suitable distance metric or other indication of a difference between two tables or vectors may be used (such as a Pearson correlation coefficient, a Jaccard Similarity, or a Tanimoto score), and the present disclosure is not limited to a cosine similarity to indicate a similarity (and thus also the difference) between two vectors.

Figure 4:
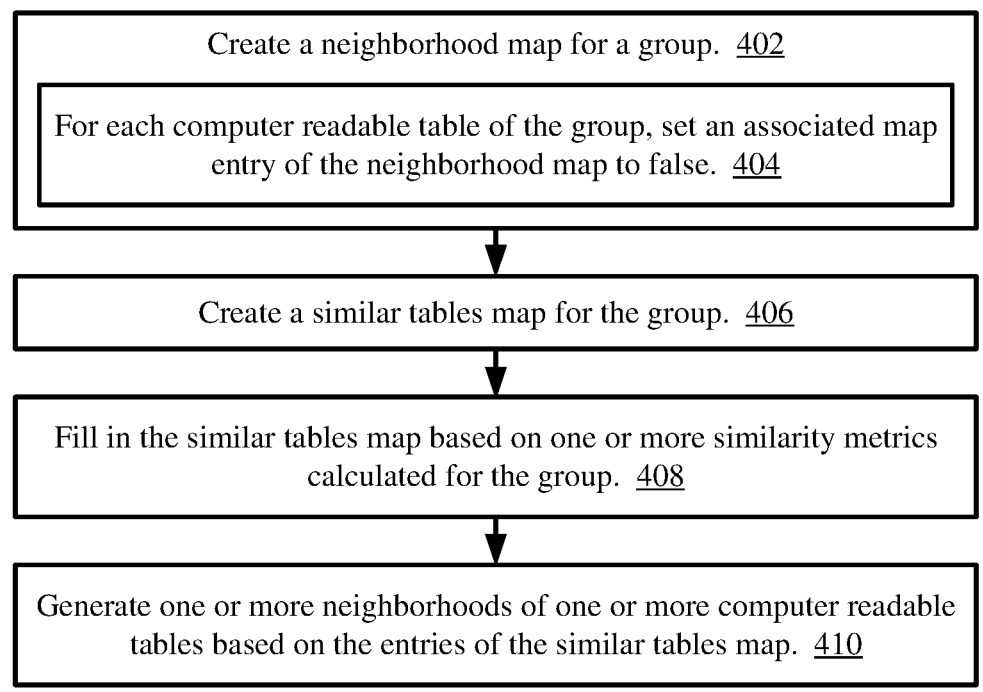
FIG. 4 shows a flowchart depicting an example operation for generating one or more neighborhoods of computer readable tables from a group of computer readable tables, according to some implementations.

In some implementations of clustering tables into neighborhoods based on a similarity metric, the neighborhood generation engine 150 may implement a brute force method of calculating a similarity metric for all possible pairs of vectors or tables of a group and clustering the possible pairs of vectors into neighborhoods using any suitable clustering means (such as using K-means clustering, density-based spatial clustering of applications with noise (DBSCAN), or any other suitable clustering means) based on either the similarity metrics or indications as to whether the corresponding tables are similar after comparing the similarity metrics to a threshold. While the brute force method may be sufficient if sufficient processing resources and time exists to perform all similarity metric calculations, to save processing resources and time, the neighborhood generation engine 150 may perform operations alternative to the brute force method to prevent requiring calculating a similarity metric between every possible pair of vectors. A new means of clustering to generate neighborhoods is depicted in FIG. 4, which is described below.

Referring back to FIG. 1, in some implementations, a neighborhood may be limited to a defined minimum number of tables. For example, a neighborhood may be required to include at least two tables. In some implementations, there may be no maximum to the number of tables in a neighborhood (which could be hundreds, thousands, or even more tables). Tables not belonging to a neighborhood may be referred to as orphan tables.

In some implementations, neighborhoods may not be generated for tables in a group if a group size is too small (such as less than a threshold number of tables for a group). For example, if a bin includes only one table, the table may be assumed to be an orphan table, with the system 100 not generating a neighborhood for the bin. The minimum number of tables to be included in a group before attempting to generate a neighborhood for the group may be any suitable threshold number. For example, each bin may be required to include at least two tables before attempting to generate a neighborhood for the group.

As noted above, different pluralities of bins may be used for binning the tables/vectors. In this manner, a first set of neighborhoods may be generated for the first plurality of bins, a second set of neighborhoods may be generated for the second plurality of bins, and so on (if more than two pluralities of bins). For example, a first plurality of bins may include bins with column ranges of 1-20, 21-40, 41-60, and so on, and a second plurality of bins may include bins with column ranges of 1-10, 11-30, 31-50, and so on. As noted above, a table may be binned into a bin of the first plurality of bins and into a bin of the second plurality of bins. As a result, a table may be included in a first neighborhood in the first set of neighborhoods and in a second neighborhood in the second set of neighborhoods. In some implementations, the neighborhood generation engine 150 may combine neighborhoods for two or more overlapping groups.

Combining two neighborhoods may include generating a union of the two neighborhoods (such as by simply merging the members of each neighborhood into one neighborhood). For example, the system 100 may include a first set of bins associated with ranges of columns 1-20, 21-40, 41-60, and so on. The system may also include a second set of bins associated with ranges of columns 1-10, 11-30, 31-50, 51-70, and so on. An example combining of neighborhoods across the bins with overlapping ranges may include combining the neighborhoods generated for bins associated with columns 1-20 and 11-30, combining the neighborhoods generated for bins associated with columns 21-40 and 31-50, and so on. In this manner, a neighborhood generated for a first bin associated with columns 1-20 and a neighborhood generated for a second bin associated with columns 11-30 (which may or may not include some overlap of members) may be combined (such as by merging the members of the two neighborhoods together into one neighborhood). To note, the present disclosure is not limited to a specific means for combining different neighborhoods to generate a final set of neighborhoods. Also to note, the system 100 does not require using multiple pluralities of groups (e.g., only a first set of bins associated with columns 1-20, 21-40, and so on may be used). As such, the system 100 may be configured to not perform operations to combine neighborhoods for different groups.

With the neighborhood generation engine 150 generating the one or more neighborhoods, the master table identification engine 160 identifies one or more master tables for each neighborhood. In some implementations, one master table is identified per neighborhood. Identifying a master table of a neighborhood may be based on data record information of each of the one or more tables of the neighborhood. For example, when obtaining the tables (which may include obtaining one or more of vectors associated with the tables in the datalake, tables of column names concatenated with datatypes associated with the tables in the datalake, or the datalake tables themselves), the system 100 may also obtain data record information for each obtained table. Data record information may be any type of information stored regarding the table. In some implementations, the data record information includes metadata registry (MDR) information that may be stored for a table stored in the datalake. Example MDR information includes relationships to Kafka topics, relationships to specific processors or processing systems, an Amazon® Web Services (AWS) S3 bucket path, and a creation date/time of the table. In one example, the master table identification engine 160 identifies a master table as the table in a neighborhood with the earliest creation date as indicated in the MDR information. In another example, a master table may be limited to specific Kafka topics.

In addition or alternative to MDR information, data record information may include observability information stored for a table. Example observability information may include the number of reads from the table, the number of writes to the table, and the last read time. In some implementations, the master table identification engine 160 may identify a table in a neighborhood with the greatest number of reads or the greatest number of combined reads and writes as a master table. If both MDR information and observability information is used to identify a master table, the master table identification engine 160 may use any suitable means to combine the two types of information to identify a master table. For example, the master table identification engine 160 may identify as a master table of a neighborhood the oldest created table with a minimum number of reads and/or writes.

In some implementations of identifying a master table, outliers of data record information may be identified in identifying a master table. In this manner, a table not associated with outlier data record information may be excluded from being a master table. For example, the system 100 may identify tables having quantifiable MDR information that is an outlier from the MDR information of other tables in a neighborhood, and the tables with such outlier MDR information may be processed to determine which table is the master table (as described above, such as the table with the most reads or the most reads and writes from the tables being processed). As such, for the system 100 to determine whether a table in a neighborhood is to be a master table, the system 100 may first determine that the table is an outlier with reference to its data record information. The system 100 may identify the outlier data record information of a neighborhood and then identify a master table from the tables associated with the outlier data record information. A table with an outlier similarity metric may also be referred to as an outlier table.

Any suitable data record information may be used for identifying outlier data tables. For example, the system 100 may use one or more of the date the table was last read, the number of reads of the table over the last six months, the number of reads and writes for the table over the last six months, or the creation date of the table. To note, the system 100 is not limited to the example data record information listed above. In some implementations of using data record information to identify outliers, the master table identification engine 160 may identify for a table if a quantifiable metric of the data record information for the table is greater than a threshold.

In some specific implementations of identifying an outlier using the data record information, the quantifiable metric (such as number of reads over the last six months) for the tables of a neighborhood may be sorted or otherwise analyzed to determine the quantifiable metric of a threshold percentile, range or metric of the quantifiable metrics. For example, the master table identification engine 160 may be configured such that the quantifiable metric of an outlier table is to be in the 90th percentile (or another suitable percentile) of the quantifiable metrics for the neighborhood.

In another example, the master table identification engine 160 may be configured such that a quantifiable metric associated with an outlier table is to be in the upper quartile range of the similarity metrics when using interquartile range (IQR) to separate the quantifiable metrics. In this manner, a table is to be associated with a quantifiable metric of the data record information in the top 25 percent of the quantifiable metrics in order to be for consideration as a master table. If the quantifiable metric is in the bottom 75 percent, the master table identification engine 160 may not consider the table an outlier table and may exclude the table from being considered as a master table. In a further example, the master table identification engine 160 may be configured such that a quantifiable metric of the data record information associated with a master table is to be three times (or another suitable number of times) the standard deviation above the median (or the mean) of the quantifiable metrics in order for the table to be considered an outlier table.

Tables associated with a quantifiable metric below the threshold (such as less than the 90th percentile of quantifiable metrics for the data record information of the tables in the neighborhood, less than the top quarter of an IQR of the quantifiable metrics for the data record information of the tables in the neighborhood, or less than three standard deviations above the median quantifiable metric for the data record information of the tables in the neighborhood) are not considered an outlier table and are excluded from being considered as a master table. While some examples are provided for identifying one or more master tables for a generated neighborhood, any suitable means may be used to identify a master table. As such, the present disclosure is not limited to the provided examples.

The grouping engine 140, the neighborhood generation engine 150, and the master table identification engine 160 may be implemented in software, hardware, or a combination thereof. In some implementations, the grouping engine 140 may be embodied in instructions that, when executed by the processor 130, cause the system 100 to perform operations associated with the grouping engine 140. In some implementations, the neighborhood generation engine 150 may be embodied in instructions that, when executed by the processor 130, cause the system 100 to perform operations associated with the neighborhood generation engine 150. In some implementations, the master table identification engine 160 may be embodied in instructions that, when executed by the processor 130, cause the system 100 to perform operations associated with the master table identification engine 160. The instructions of one or more of the components 140-160 may be stored in memory 135, the database 120, or another suitable memory. The instructions may be in the Python programming language format or another suitable computer readable format for execution by the system 100 (such as by the processor 130).

The particular architecture of the system 100 shown in FIG. 1 is but one example of a variety of different architectures within which aspects of the present disclosure may be implemented. For example, in other implementations, components of the system 100 may be distributed across multiple devices, may be included in fewer components, and so on. While the below examples of generating neighborhoods and identifying master tables are described with reference to system 100, any suitable system may be used to perform the operations described herein.

Figure 3:
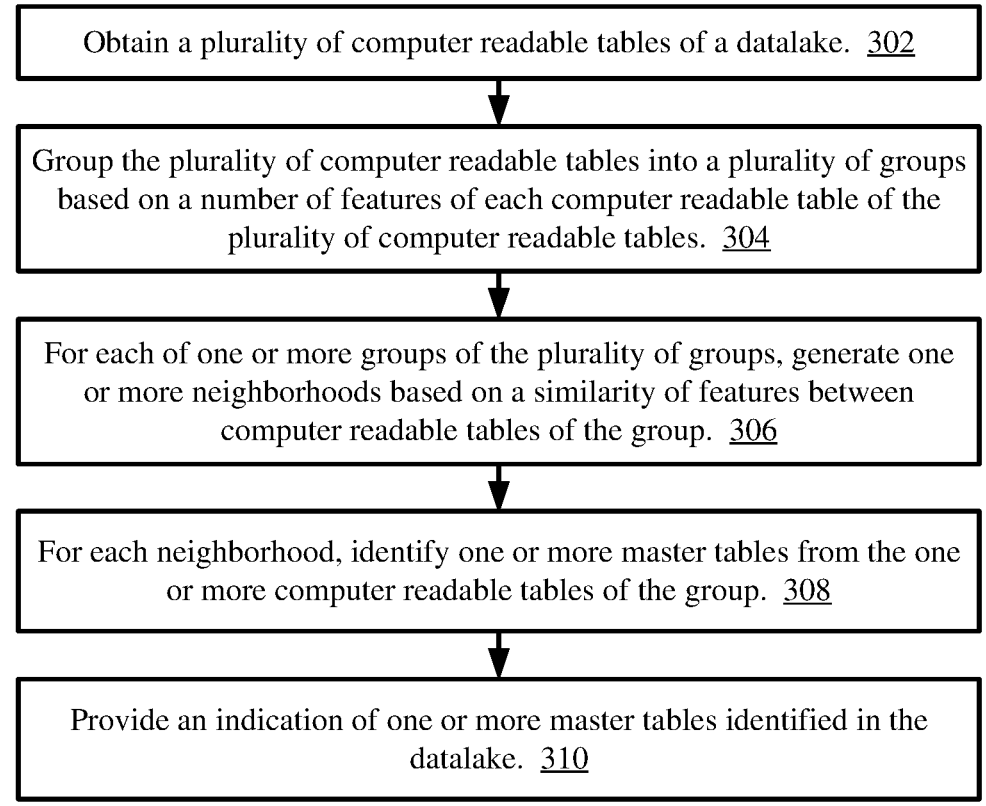
FIG. 3 shows an illustrative flow chart depicting an example operation for processing a plurality of computer readable tables of a datalake to identify one or more master tables, according to some implementations.

FIG. 3 shows an illustrative flow chart depicting an example operation 300 for processing a plurality of computer readable tables of a datalake to identify one or more master tables, according to some implementations. At 302, the system 100 (such as the interface 110) obtains a plurality of computer readable tables of a datalake. Each table includes one or more features. As noted above, obtaining the computer readable tables may include one or more of obtaining the vectors associated with the computer readable tables, obtaining tables of column names (which may be concatenated with datatypes) associated with the computer readable tables, or obtaining the computer readable tables themselves. In some implementations, each of the one or more features of the computer readable table is represented in a column of the computer readable table. As noted above, for a computer readable table, column names may be concatenated with the corresponding datatypes of the columns of the computer readable table to generate a table (or other indication) of column names and datatypes. The concatenated column names and datatypes may be input into a word to vector model to generate the vector for the computer readable table.

At 304, the system 100 (such as the grouping engine 140) groups the plurality of computer readable tables into a plurality of groups based on a number of features of each computer readable table of the plurality of computer readable tables. As noted above, grouping the plurality of computer readable tables into the plurality of groups may include binning each of the plurality of computer readable tables into a bin of a first plurality of bins, with each bin of the first plurality of bins corresponding to a first range of number of columns (such as 1-20, 21-40, and so on). In some implementations, the order of the tables in the group or bin is based on observability data of the tables. For example, the total number of reads (or a total number of reads and writes) of a computer readable table may be used to order the tables (such as from the greatest number of reads to fewest number of reads) in a group. In some implementations, grouping the plurality of computer readable tables into the plurality of groups may also include binning each of the plurality of computer readable tables into a bin of a second plurality of bins, with each bin of the second plurality of bins corresponding to a second range of number of columns and each of the second ranges being between consecutive ranges of the first ranges. For example, if the first ranges of number of columns includes 1-20, 21-40, and so on, the second ranges of number of columns may include 1-10, 11-30, 31-50, and so on. While the endpoints of the second ranges are depicted as being equidistant within the first ranges such that two of the first ranges equally overlap a second range, the endpoints of the second range may occur anywhere within the first ranges (such as 1-16, 17-35, etc.). While two pluralities of bins of two ranges are depicted any number of pluralities of bins and ranges may be used, such as described above.

At 306, the system 100 (such as the neighborhood generation engine 150) generates, for each of one or more groups of the plurality of groups, one or more neighborhoods based on a similarity of features between computer readable tables of the group. Each neighborhood includes one or more computer readable tables of the group. In some implementations, the neighborhood may be limited to a minimum size (such as no fewer than two tables). Generating the one or more neighborhoods may include calculating a similarity metric between vectors for one or more pairs of corresponding computer readable tables of the group and clustering the one or more computer readable tables of the group into the one or more neighborhoods based on the calculated similarity metrics. In some implementations and as described above, the system 100 may be configured to perform the brute force method to cluster the tables into neighborhoods based on the similarity metrics. In this manner, a similarity metric is calculated for every pair of tables in the group. Alternatively, the system 100 may perform a different means of clustering the tables based on the similarity metrics to prevent calculating a similarity metric for every pair of tables in the group.

FIG. 4 shows a flowchart depicting an example operation 400 for generating one or more neighborhoods of computer readable tables from a group of computer readable tables, according to some implementations. The operation 400 may be an example implementation of block 306 of operation 300 in FIG. 3, and the operation 400 may be performed for each of one or more groups generated by the system 100. For the example operation 400, the system 100 is to keep track of which tables are added to neighborhoods. Alternatively, the system 100 may keep track of which tables have been compared to each other to ensure that each table is compared to at least one other table. However, each table is not required to be compared to every other table as required by the brute force method described above. A neighborhood map may be used to keep track as to whether a table is found to be similar to as least one other table of a group. A similar tables map may be used to keep track of the tables included in a generated neighborhood by indicating a specific table to which another table is similar.

At 402, the system 100 creates a neighborhood map for a group. Creating a neighborhood map may refer to generating a brand new map, modifying a previously created map no longer in use, resetting a previously created map, or otherwise causing a neighborhood map to exist that may be used for the group. The neighborhood map may be any suitable means to indicate which tables have been added to a neighborhood. For example, the neighborhood map may be a y×2 table for a group of y number of tables. The first column may indicate a name or another identifier of a table, and the second column may indicate whether the corresponding table has been added to a neighborhood. For example, the second column may include a true/false indicator (such as a binary flag or another suitable type of indicator) to indicate whether the corresponding table has been added to a neighborhood. The tables of the group may be included in the neighborhood map in any order. For example, the tables may be added to the neighborhood map in alphabetical order, in chronological order of being added to the group, in order of creation date, in random order, or in any other suitable order. In some implementations, the order of the tables in the neighborhood map is based on observability data of the tables. For example, the total number of reads (or a total number of reads and writes) of a computer readable table may be used to order the tables (such as from the greatest number of reads to fewest number of reads). In this manner, the table having the greatest number of reads will be included first in the neighborhood map, the table having the second greatest number of reads will be included next in the neighborhood map, and so on until all tables are included in the neighborhood map. In creating the neighborhood map, the system 100 may, for each computer readable table of the group, set an associated map entry of the neighborhood map to false (404). For example, if the neighborhood map is a y×2 table, each entry of the second column may be set to false (such as 0 for a binary flag or another suitable indicator). As such, the neighborhood map initially indicates that none of the tables are similar to another table. While a y×2 table is described as the neighborhood map, the neighborhood map may be a list of flags or other objects to keep track as to whether a table has been added to a neighborhood. In some other implementations, the neighborhood map may be any suitable indication of whether a table has been compared to at least one other table. In this manner, the neighborhood map may keep track of if a table has been compared to at least one other table. To note, the neighborhood map indicating which tables have been added to a neighborhood also infers that certain tables have been compared to at least one other table (since to add a table to a neighborhood, the table is compared to at least one other table). As such, the present disclosure is not limited to a specific embodiment of a neighborhood map.

At 406, the system 100 creates a similar tables map. Creating a similar tables map may refer to generating a brand new map, modifying a previously created map no longer in use, resetting a previously created map, or otherwise causing a similar tables map to exist that may be used for the group. The similar tables map indicates to which specific table a table is similar (if any). In some implementations, the similar tables map may be a y x 2 map for a group of y tables. The first column may indicate a name or other identifier of a table, and the second column may indicate to which other table the corresponding table is associated. For example, the second column may include the name or identifier of the other table to which the corresponding table is similar. Null data or other suitable information may be included in the second column to indicate that no similarities have yet been found. In some other implementations of a similar tables map, the similar tables may be a y x y map for the group of y tables. Each row corresponds to a different computer readable table, and each column corresponds to a different computer readable table. In this manner, each entry in the table corresponds to a pair of computer readable tables based on the row and column. The entries may include a flag or other indicator to indicate if the corresponding tables are similar. Alternatively, the similar tables map and the neighborhood map may be included in one map. For example, a neighborhood map may be a y×3 table, with the third column indicating to which table the corresponding table is similar (such as by indicating the column name or another suitable identifier). While a table is described as the similar tables map, the similar tables map may be a list of indicators or other objects to keep track of which table is similar to a table corresponding to the indicator. As such, the present disclosure is not limited to a specific embodiment of a similar tables map.

Figure 5:
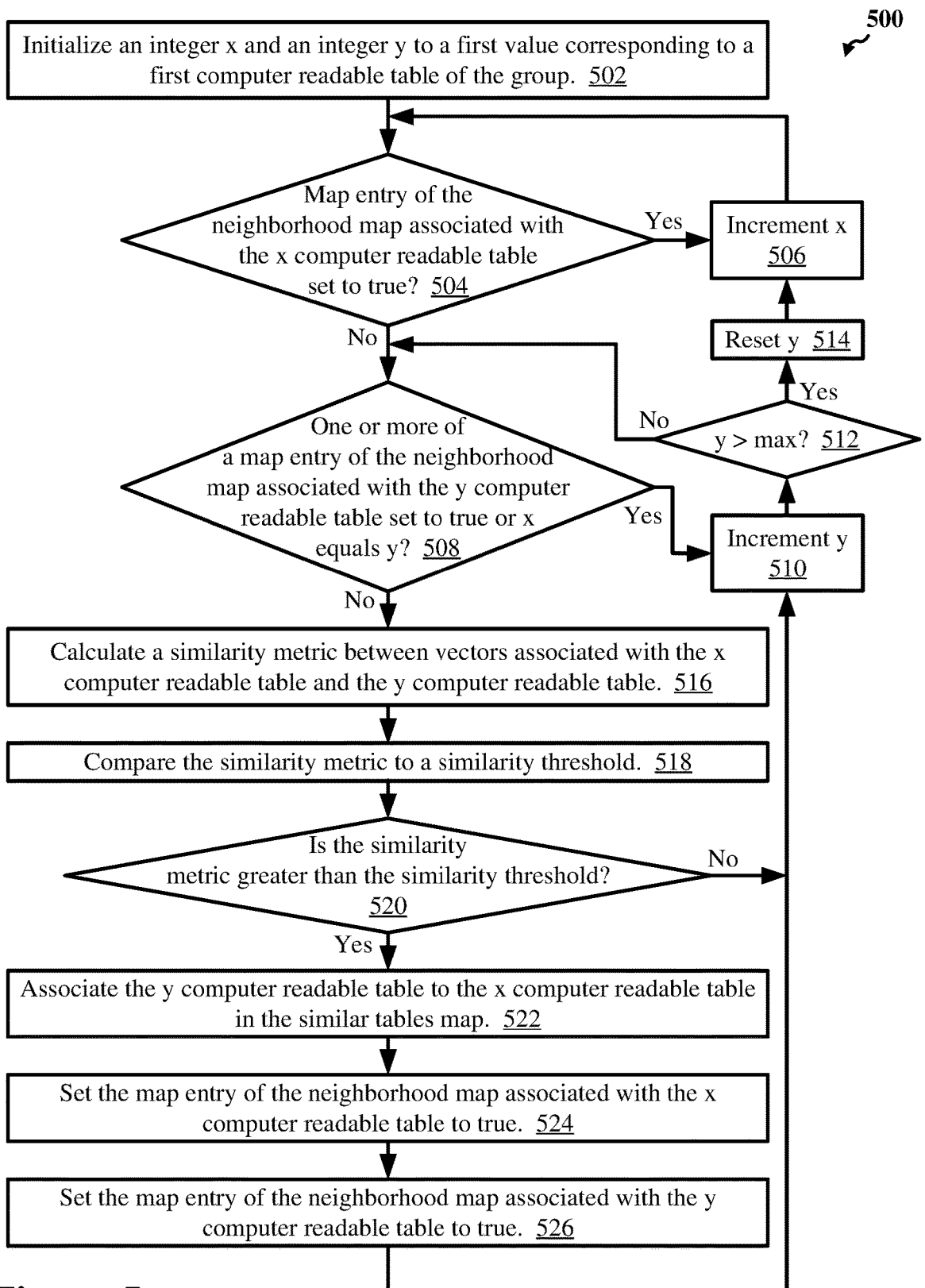
FIG. 5 shows a flowchart depicting an example operation for filling in a similar tables map, according to some implementations.

At 408, the system 100 fills in the similar tables map based on one or more similarity metrics calculated for the group. As noted above, when the similar tables map is filled in, the similar tables map indicates to which table a table is similar, and such indications may be used to generate one or more neighborhoods. An example implementation of block 408 is depicted in FIG. 5 and described below. Referring back to FIG. 4, at 410, the system 100 generates one or more neighborhoods of one or more computer readable tables based on the entries of the similar tables map. For example, all of the tables that are indicated as similar to the same table (such as, e.g., a table 2, table 5, and table 7 of a group being compared to and indicated as similar to a table 1 of the group) are clustered together into one neighborhood (such as tables 1, 2, 5, and 7 from the above example being clustered together into the same neighborhood). In some implementations, if the similar tables map does not indicate that a table is similar to another table (such as the entry in the similar tables map still being a null data set or some other value indicating that a similarity has not yet been identified for the table), the table is not included in a neighborhood (and thus the table may be considered an orphan table). As noted above, orphan tables are not considered for being a master table. Referring back to block 408, an iterative set of operations may be repeated for different tables to fill in the similar tables map and the neighborhood map.

FIG. 5 shows a flowchart depicting an example operation 500 for filling in a similar tables map, according to some implementations. The operation 500 may be an example implementation of block 408 of operation 400 in FIG. 4. At 502, the system 100 initializes an integer x and an integer y to a first value corresponding to a first computer readable table of the group. For example, if the neighborhood map is an n×2 table and the similar tables map is an n×2 table for an integer n equal to the number of tables in the group, x and y may be set to 1. In the example operation 500, integers x and y are used to keep track of which tables are being compared and which entries of the maps are to be filled in. In progressing through the possible combinations of x and y (such as from 1 to n for each of x and y for n tables in a group), each table is compared to at least one other table in the group. However, any suitable means may be used to keep track of which tables are being compared and which entries of the maps are to be filled in to ensure that each table is compared to at least one other table in the group. To note, the order of the tables for which x and y are used to progress through comparing the tables to one another may be any suitable order. In some implementations, the order of the tables is based on the observability data (such as total number of reads of the table or total number of reads and writes for the table). In this manner, table 1 (i.e., the first table in the order) may be the table having the greatest number of reads (or the greatest number of reads and writes). While some examples are provided for ordering the tables, other suitable orderings may be used.

At decision block 504, the system determines the map entry in the neighborhood map for the x computer readable table. For example, if x is 1 and the neighborhood map is an n×2 map, the system 100 determines the entry in the first row, second column of the map. If the map entry of the neighborhood map associated with the x computer readable table is set to true (such as the entry being a 1 for a binary flag or a "true" or "T"), the x computer readable table has already been found to be similar to another computer readable table in the group. As such, no further comparisons of the table are performed, and the process flows to 506. At 506, the system 100 increments x, and the process reverts back to decision block 504. While not shown in FIG. 5, the process ends when x is greater than a maximum x. For example, if x is set to 1 and the number of tables in the group is an integer n, x being greater than n indicates that all tables of the group have been compared to at least one other table of the group. As such, the process ends when x is greater than n.

If the map entry of the neighborhood map associated with the x computer readable table is not set to true (such as being set to a 0 for a binary flag or "false" or "F"), the x computer readable table has not been found to be similar to another computer readable table in the group. As such, the x computer readable table is to be compared to at least one other computer readable table of the group, and the process continues to decision block 508. To note, referring back to FIG. 4, the neighborhood map entries are set to false at block 404. As a result, the map entry is set to false for at least the first time through decision block 504, and the process flows to decision block 508 at least the first time through decision block 504.

At decision block 508, with the neighborhood map entry for the x computer readable table set to false, the system 100 determines if one or more of a map entry of the neighborhood map associated with the y computer readable table is set to true or x equals y. In determining if the neighborhood map entry for the y computer readable table is set to true, the system 100 may prevent comparing the x computer readable table and the y computer readable table if the y computer readable table has already been found to be similar to another table (such as described below with reference to block 526). For example, if table 2 is found to be similar to table 1 based on a similarity score and table 3 is not found to be similar to table 1 based on a similarity score, it is assumed that table 3 is not similar to table 2 because neighborhoods are to be mutually exclusive of each other and all tables in a neighborhood are to be similar to each other. As such, the system 100 would prevent comparing table 3 and table 2 (and thus not calculate a similarity metric from the vectors for tables 3 and 2). In addition, checking that x does not equal y ensures that a table is not compared to itself. If the neighborhood map entry associated with the y computer readable table is set to true or x equals y, the system 100 is not to compare the x computer readable table and the y computer readable table. As such, the process continues to 510. At 510, the system 100 increments y. At decision block 512, if y is greater than a maximum y (such as y being greater than n for 1 to n computer readable tables in the group), the system 100 has attempted to compare all of the computer readable tables to be compared to the x computer readable table. As such, the process continues to 514. At 514, the system 100 resets y to the first value (such as to 1), and the process continues to 506. As noted above, if x is greater than a maximum x after block 506, the process ends, as the system has compared all tables in the group to at least one other table in the group.

Referring back to decision block 508, if the neighborhood map entry associated with the y computer readable table is set to false and x does not equal y, the system 100 is to compare the x computer readable table and the y computer readable table. As such, the process continues to 516. At 516, the system calculates a similarity metric between vectors associated with the x computer readable table and the y computer readable table. For example, the system 100 may calculate a cosine similarity between vectors associated with the x and y tables, such as described above with reference to FIG. 2 and equation (1).

At 518, the system 100 compares the similarity metric to a similarity threshold. At decision block 520, if the similarity metric is not greater than the similarity threshold, the system 100 may not consider the tables to be similar. As such, no changes may be made to the neighborhood map and the similar tables map, and the process may revert to 510 (in which y is incremented so that the system 100 may determine whether the x computer readable table is to be compared to the y+1 computer readable table). Referring back to decision block 520, if the similarity metric is greater than the similarity threshold, the system 100 may determine that the x computer readable table is similar to the y computer readable table, and the neighborhood map and the similar tables map are to be updated. As such, the process continues to 522.

At 522, with the system 100 determining that the x computer readable table is similar to the y compute readable table, the system 100 associates the y computer readable table to the x computer readable table in the similar tables map. For example, the similar tables map entry for the y computer readable table may be updated to include an indication of the x computer readable table (such as to include the name or another identifier of the x computer readable table). To note, if the tables are ordered based on number of reads of the table, table y has less than or equal to the number of reads of table x. As such, each entry in the similar tables map may be to a table having a greater number of reads than the table associated with the entry. In another example, a similar tables map entry associated with both the x computer readable table and the y computer readable table (such as the x row and y column of an n×n table for n computer readable tables of the group) may be set to true or otherwise indicate that the two tables are related.

At 524, the system 100 sets the map entry of the neighborhood map associated with the x computer readable table to true. If the map entry is already set to true during a previous iteration of block 524, the system 100 setting the map entry to true may refer to the system 100 keeping the map entry as true. At 526, the system 100 also sets the map entry of the neighborhood map associated with the y computer readable table to true. As a result of blocks 524 and 526, the neighborhood map indicates that computer readable tables x and y are similar to at least one other table in the group. The process proceeds to 510, in which the system 100 increments y. Blocks 504-526 may be performed until both x and y reach their maximum values (such as n for a group consisting of tables 1–n).

The example operation 500 ensures that a table is not compared to another table if such table is already determined to be similar to another table in the group. For example, if a group includes tables 1-5 and table 1 is similar to tables 3 and 5 and table 2 is similar to table 4, the system 100 compares table 1 to 2, table 1 to table 3, table 1 to table 4, and table 1 to table 5. As a result, the system 100 calculates the similarity metric for between tables 1 and 2, tables 1 and 3, tables 1 and 4, and tables 1 and 5. Based on the similarity metrics, the system 100 determines that table 1 is similar to tables 3 and 5. The similar tables map is updated to indicate for table 3 and for table 5 that table 1 is similar to them, and the neighborhood map is updated to indicate that a similar table is found for tables 1, 3 and 5. With table 1 not being similar to tables 2 and 4, the similar tables map and the neighborhood map is not updated with reference to tables 2 and 4. Since the neighborhood map is not updated with reference to table 2, the system 100 attempts to find a similar table to table 2. Since table 1 is already indicated as having a similar table in the neighborhood map, table 2 is not compared to table 1. Also, since x would equal y if table 2 would be compared to itself, table 2 is not compared to itself. Further, since table 3 is already indicated as having a similar table in the neighborhood map, table 2 is not compared to table 3. In this manner, the system excludes calculating a similarity metric for the pair of tables 2 and 3. Since table 4 is not indicated as having a similar table in the neighborhood map, table 2 is compared to table 4 (such as generating a similarity metric and comparing such metric to a threshold). With table 2 being similar to table 4, the similar tables map is updated to indicate for table 4 that table 2 is similar to it, and the neighborhood map is updated to indicate that a similar table is found for tables 2 and 4. As a result, all tables in the neighborhood map are indicated as having a similar table. As x and y are incremented as described above, no further comparisons are made by the system 100. For example, a similarity metric is not generated for the pair of tables 3 and 4, the pair of tables 4 and 5, and so on.

In reviewing the similar tables map, the similar tables map indicates that table 1 is similar to tables 3 and 5, and the system 100 may generate a first neighborhood including tables 1, 3, and 5 based on the similar tables map in 410 of the operation 400 in FIG. 4. In addition, the similar tables map indicates that table 2 is similar to table 4, and the system 100 may generate a second neighborhood including tables 2 and 4 based on the similar tables map in 410 of the operation 400 in FIG. 4. While not shown in the example, if after incrementing both x and y to their maximums and one or more tables are not indicated as being similar to another table in the neighborhood map, such tables may be considered as orphan tables and excluded from being analyzed as potential master tables. To note, if the tables are ordered based on total number of reads, table 1 has the greatest number of reads, table 2 has the second greatest number of reads, and so on. As such, in incrementing x and y as described above, the system 100 may progress through comparing tables having a smaller and smaller number of reads until the process completes.

While the blocks of operation 500 are described as being performed in a specific sequence, in some implementations, one or more blocks or instances of blocks may be performed concurrently or in a different sequence while still performing the intending aspects of the clustering of tables into neighborhoods.

Referring back to 306 of operation 300 in FIG. 3, neighborhoods may be generated for each of one or more groups. As noted above, one or more groups may be based on a first plurality of bins. In some implementations, the system 100 may generate a second one or more groups based on a second plurality of bins (such as described above). As a result, the system 100 may generate a first set of neighborhoods associated with the first plurality of bins and the system 100 may generate a second set of neighborhoods associated with the second plurality of bins during block 306. The system 100 may also combine the first set of neighborhoods and the second set of neighborhoods to generate the final set of neighborhoods to be used in identifying one or more master tables (such as described above including, e.g., merging a first neighborhood for a first bin with a second neighborhood for a second, overlapping bin).

To note, some groups may not have neighborhoods created for the group. For example, if a bin includes less than two tables (or another defined minimum number of tables), the system 100 may prevent attempting to generate a neighborhood for the bin. In another example, if all tables in a group are dissimilar from each other, the system 100 does not generate a neighborhood for the group.

At 308, the system 100 (such as the master table identification engine 160) identifies, for each neighborhood, one or more master tables from the one or more computer readable tables of the group. For example, the system 100 may determine, for each neighborhood, a master table from the tables of the neighborhood. As noted above, the master table may be identified based on data record information associated with the computer readable tables. For example, the oldest created table of the table with the most reads and writes may be identified as the master table. In some implementations, if the tables are sorted for comparing the tables (such as in performing process 500) based on total number of reads (or total number of reads and writes), any table indicated in the similar tables map may be assumed to be a master table (with the tables indicated in an entry having a greater number of reads or a greater number of reads and writes than the table associated with the entry). However, identifying a master table may be determined in any other suitable manner.

At 310, the system 100 provides (such as via the interface 110) an indication of the one or more master tables identified in the datalake. For example, the system 100 may provide an indication that is displayed to a user to indicate one or more master tables in the datalake. In another example, the system 100 may provide an indication to the datalake or to another system in order to tag the tables in the datalake that are identified as master tables. If no master tables are identified, the system 100 may provide an indication of such to a user or to another system. While not depicted in FIG. 3, the system 100 may also provide an indication of the neighborhoods generated, the similarity metrics calculated, or any other data used in identifying the one or more master tables.

While some example implementations of grouping and generating the neighborhoods are described above (such as with reference to FIGS. 4 and 5), the system 100 may be configured to group tables and generate one or more neighborhoods using another approach of grouping and clustering, such as described below with reference to FIGS. 6 and 7.

Figure 6:
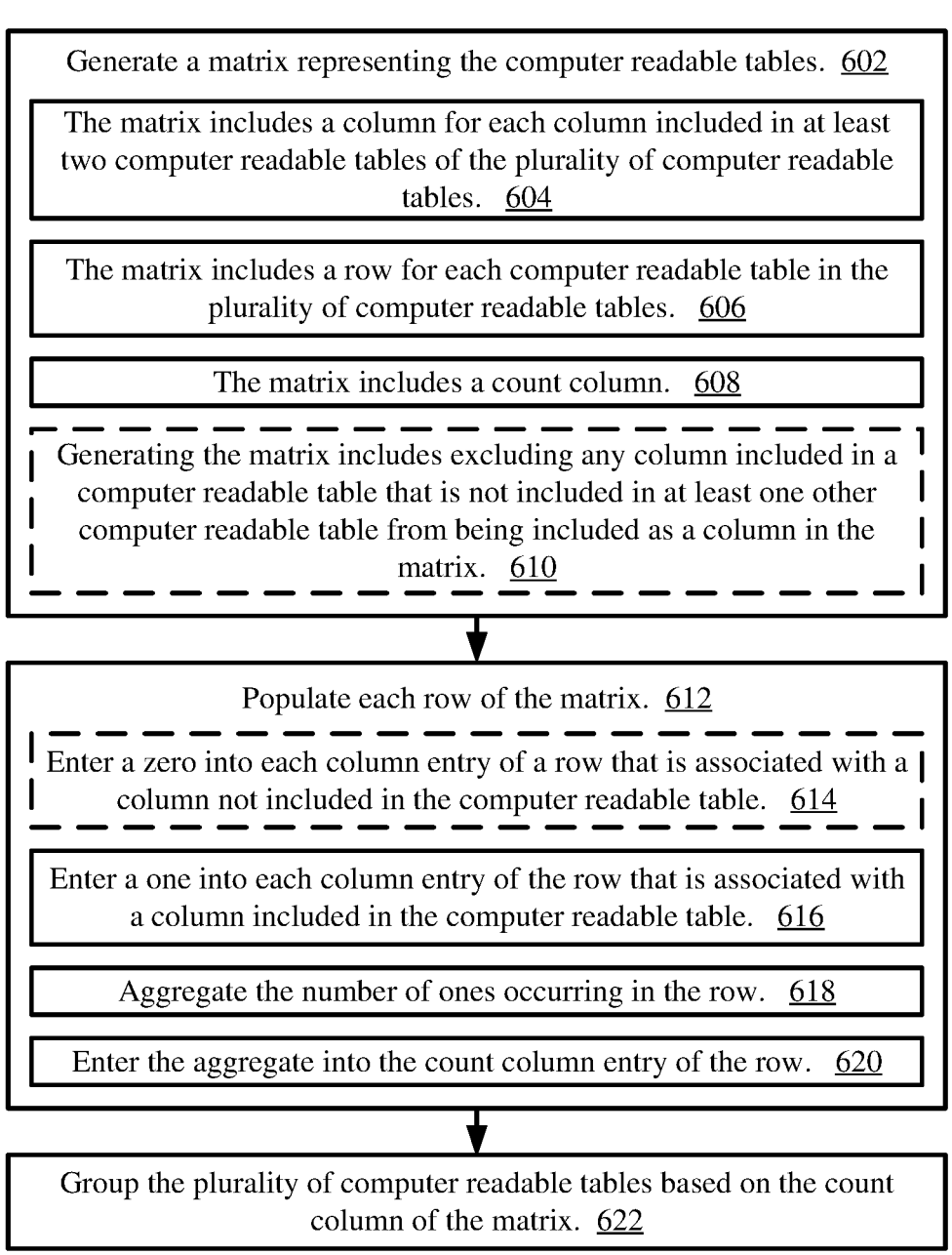
FIG. 6 shows a flowchart depicting an example operation for generating one or more neighborhoods of computer readable tables, according to some implementations.

FIG. 6 shows a flowchart depicting an example operation 600 for grouping computer readable tables, according to some implementations. The operation 600 may be an example implementation of block 304 of operation 300 in FIG. 3. In operation 600, the system 100 is configured to create and manipulate a matrix depicting the computer readable tables of the datalake to determine neighborhoods based on neighboring rows in the matrix. For example, a matrix may include a row for each table, and the entries in the row indicate the existence of a specific column in the table associated with the row.

In generalizing the matrix for z number of tables (for any integer z), a generic matrix for the z number of tables is depicted in Table 1 below:

TABLE 1

| Table Name | Column 1 | Column 2 | ... | Column w | Count |
|---|---|---|---|---|---|
| Table 1 | 1 | 1 | | 1 | 9 |
| Table 2 | 1 | 0 | | 1 | 5 |
| ... | | | | | |
| Table z | 0 | 1 | | 0 | 18 |

The matrix includes a row for each table, and the tables are identified by name. Each column represents a feature that may be included in one or more tables. For example, each column may represent a column that appears in at least two tables. In this manner, the matrix is contained in size to not include entries associated with a feature that only appears in one table (which may not be helpful in comparing a similarity of the table to other tables in a group). In another example, each column may represent a column that appears in at least one table. In this manner, the matrix may include a column for each table column associated with a feature that appears in at least one table. For a matrix requiring a feature to be included in at least two tables, the column entries in the matrix indicate whether the column appears in the specific table and at least one other table. For example, a 0 indicates that the column does not appear in the corresponding table, and a 1 indicates that the column appears in the corresponding table. In table 1 above, the total number of columns that appear in at least two tables in the datalake is w (for any suitable integer w). To note, w may be a large number for some datalakes, such as in the thousands or tens of thousands. As described in more detail below, the count column of the matrix in table 1 indicates the number of columns or features that exists in the corresponding table and at least one other table (such as by counting the number of is to the left of the entry in the count column). For example, table 1 includes 9 columns or features that are included in at least one other table, table 2 includes 5 columns or features that are included in at least one other table, and so on. To note, counting whether a table exists in at least one other table ensures that the column may be used in comparing at least the two tables including the columns. If a table includes a column that is not included in any other table, the column cannot be used to show that two tables are similar. While some example implementations of a matrix are provided, there may be various implementations of the matrix that may be used in generating neighborhoods for a plurality of computer readable tables, and the present disclosure is not limited to a specific implementation of a matrix.

As noted above, different table columns may be associated with different datatypes. In some instances, a same column name may be used for two different types of columns associated with different datatypes. As such, in some implementations, the column names used for generating the matrix may also be based on datatype (such as a concatenation of column name and datatype) to ensure that different types of column with the same name are not mistaken as the same type of column.

Referring back to FIG. 6, the system 100 generates a matrix representing the computer readable tables (such as the plurality of computer readable tables obtained in block 302 of operation 300 in FIG. 3). The matrix includes a column for each column included in at least two computer readable tables of the plurality of computer readable tables (604). To note, even if the matrix is configured to include a column for each table column that appears in at least one table, the matrix will still include the columns for table columns included in at least two tables. The matrix also includes a row for each computer readable table in the plurality of computer readable tables (606). The matrix also includes a count column (608). Such a matrix is depicted in general in table 1 above.

In some implementations of 602, generating the matrix includes excluding any column included in a computer readable table that is not included in at least one other computer readable table from being included as a column in the matrix (610). In this manner, each column associated with a feature in the matrix is required to correspond to a column table occurring in at least two computer readable tables. If 610 is performed, a table column that appears in only one table is not included as a column in the matrix.

At 612, the system populates each row of the matrix. In some implementations of populating each row, the system 100 enters a zero into each column entry of a row that is associated with a column not included in the computer readable table (614). For example, referring to the matrix in Table 1 above, column2 is not included in table 2. As such, the corresponding entry in the matrix is a zero. In addition, populating each row may include entering a one into each column entry of the row that is associated with a column included in the computer readable table (616), aggregating the number of ones occurring in the row (618), and entering the aggregate into the count column entry of the row (620). For example for the matrix in table 1 above, the computer readable table 2 includes column1, does not include column2, and so on to also include column w. The number of ones in the row from column1 to column w is five (indicating that five of the columns in table 2 also are included in at least one other table), and five is entered into the count column entry for the row.

After populating the matrix, at 622, the system 100 groups the plurality of computer readable tables based on the count column of the matrix. For example, the system 100 may sort the matrix based on the count column. In referring to the example matrix in table 1 above and assuming only tables 1, 2 and z exist in a simplified example, an example sorted matrix based on the count column is depicted in table 2 below:

TABLE 2

| Table Name | Column 1 | Column 2 | ... | Column w | Count |
|---|---|---|---|---|---|
| Table z | 0 | 1 | | 0 | 18 |
| Table 1 | 1 | 1 | | 1 | 9 |
| Table 2 | 1 | 0 | | 1 | 5 |

As shown, the row associated with table z precedes the row associated with table 1 based on the count 18 being greater than 9, and the row associated with table 1 precedes the row associated with table 2 based on the count 9 being greater than 5. In this manner, the rows may be ordered from highest count to lowest count. Alternatively, the rows may be ordered from lowest count to highest count. A matrix may include a plurality of rows with the same count. For example, 20 rows may include a count of 100. In some implementations, the system 100 orders the rows with the same count based on observability data of the associated tables. For example, the rows with the same count may be ordered in the matrix based on the number of reads of the associated table or the number of reads and writes of the associated table. While some examples of ordering tables with the same count are provided, the system 100 may order the rows with the same count in any suitable manner.

After ordering the rows, tables may be grouped together based on the rows in the matrix associated with such tables neighboring each other. In some implementations, an integer n number of rows above or below a row may be grouped together to be used for generating one or more neighborhoods. For example, if n is defined as 20, the system 100 may attempt to group the first row and twenty rows after the first row of the sorted matrix together, with the 21 rows in the group being used to attempt to generate one or more neighborhoods of tables corresponding to the 21 rows. The n number of rows above and below a row to be compared to that row may be determined in any suitable manner. In some implementations, the number of rows to be compared may be based on a percentage of the count for a row. For example, for row g in a sorted matrix, the count may be 100 (indicating that the table associated with row g includes 100 columns that also appear in at least one other table). The number of rows of the matrix to be used for comparison for row g (and for each of the other rows of the matrix) may be 20 percent less than the count and 20 percent more than the count. In this manner, for row g, rows with a count from 80 to 120 are to be used for comparison. As such, the tables associated with the rows with counts 80 to 120 may be considered a group of tables as described herein. Example implementations of grouping and generating neighborhoods based on the matrix are described in more detail below (such as with reference to FIG. 7).

Figure 7:
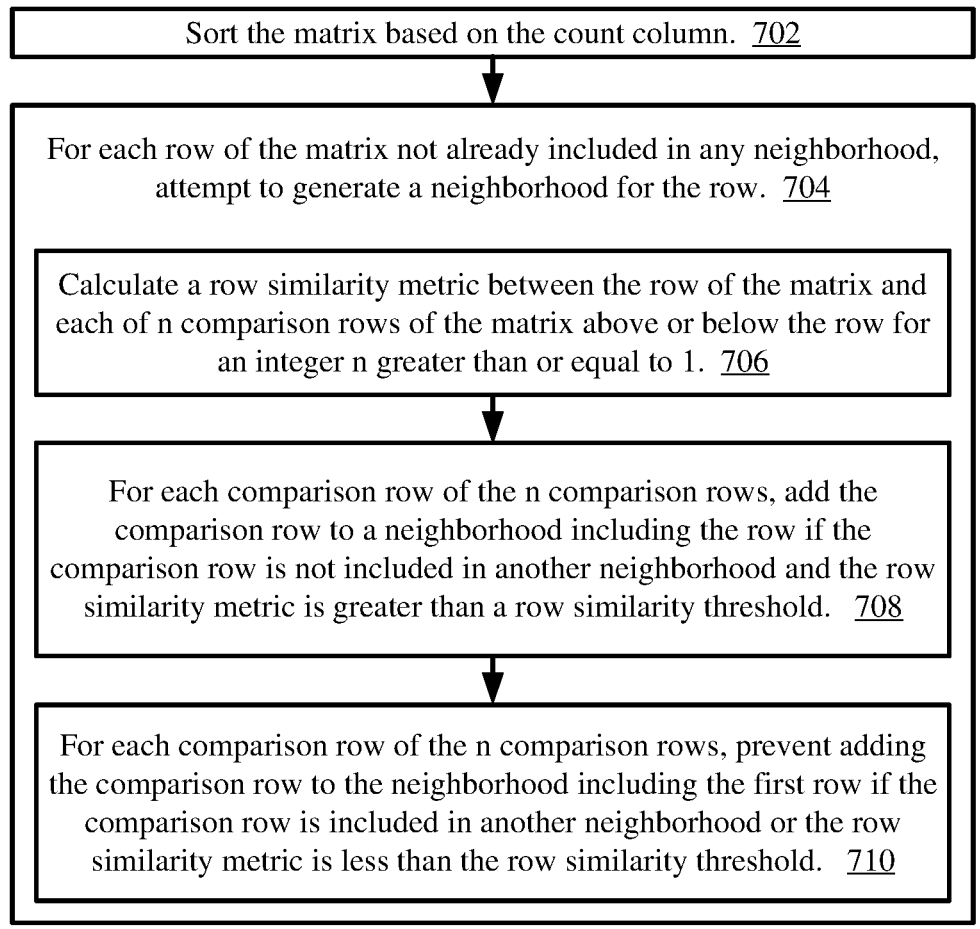
FIG. 7 shows a flowchart depicting an example operation for generating one or more neighborhoods of tables based on a sorted matrix, according to some implementations.

FIG. 7 shows a flowchart depicting an example operation 700 for generating one or more neighborhoods of tables based on a sorted matrix, according to some implementations. The operation 700 may be an example implementation of block 306 of operation 300 in FIG. 3. In some implementations, the system 100 may perform operation 700 in conjunction with operation 600 to generate one or more neighborhoods based on a sorted matrix generated by the system 100.

At 702, the system 100 sorts the matrix based on the count column (such as described above). The matrix may be sorted with the count column ascending or descending. Either way, the rows neighbor other rows associated with tables that have similar numbers of columns included in at least two tables. If two or more rows include the same count, the rows may be ordered based on observability data (such as the greatest number of reads or the greatest number of reads and writes). Alternatively, the rows may be kept in the order they were added to the matrix (such as in alphabetical order based on table names) or in any other suitable order as long as the rows with the same count neighbor each other in the sorted matrix.

At 704, the system 100 attempts to generate, for each row of the matrix not already included in any neighborhood, a neighborhood for the row. As used herein, a row in a neighborhood refers to the table associated with the row being in a neighborhood of tables generated by the system 100. For example, a neighborhood including ten rows refers to the ten tables corresponding to the ten rows being included in a neighborhood. To generate one or more neighborhoods for the rows of the sorted matrix, the system 100 may recursively perform blocks 706-710. In describing blocks 706-710 in general, the system 100 groups the rows neighboring each other (such as described above with reference to block 622 of operation 600 in FIG. 6). For example, a group for a row g having a count h may include rows from having a count (h−0.2*h) to having a count (h+0.2*h) (or any other suitable percentage of h). The system 100 also attempts to create a neighborhood of tables for the table associated with the row used to generate the group of rows.

At 706, the system 100 calculates, for each row of the matrix not already included in any neighborhood, a row similarity metric between the row of the matrix and each of n comparison rows of the matrix above or below the row for an integer n greater than or equal to 1. Integer n may be defined as any suitable number. For example, n may be 1, 2, 5, 8, 15, and so on. As noted above, in some implementations, integer n may be based on a number of rows above a row having a count that is no more than a defined percentage (such as 20 percent) less than the count for that row, and integer n may also be based on a number of rows below a row having a count that is no more than a defined percentage (such as 20 percent) greater than the count for that row (assuming that the matrix is sorted based on count in descending ordered. In some other implementations, integer n may be based on the size of the table. In some other implementations, integer n may be defined or adjusted by a user based on analysis of previous different integer n used for grouping rows or to meet a user's wishes.

The system 100 calculates a row similarity metric between the first row and each of the n rows neighboring the first row. For example, referring to table 2 above, the entries of a row of a sorted matrix from column1 to column w may be treated as a vector. For row 1 (table z), the vector may be [0, 1, ..., 0]. For row 2 (table 1), the vector may be [1, 1, ..., 1]. For row 3 (table 2), the vector may be [1, 0, . . . , 1]. The system 100 may calculate a cosine similarity (or another suitable similarity metric, such as described above) between the vector for table z and each of the n vectors for rows neighboring the row for table z. In this manner, the system 100 generates n number of similarity scores associated with the first row. To note, if n is based on the count for a row (such as to compare rows with a count within plus or minus 20 percent of the count of the row in focus), n may vary between rows based on a variation in the count.

At 708, the system 100 adds, for each comparison row of the n comparison rows, the comparison row to a neighborhood including the row if the comparison row is not included in another neighborhood and the row similarity metric is greater than a row similarity threshold. At 710, the system 100 prevents adding, for each comparison row of the n comparison rows, the comparison row to a neighborhood including the row if the comparison row is included in another neighborhood or the row similarity metric is less than the row similarity threshold.

For example, from the sorted matrix of table 2 above, if the row similarity metric between table z and table 1 is greater than the row similarity threshold, table z and table 1 are included in the same neighborhood. Conversely, if the row similarity metric is less than the row similarity threshold, the system 100 prevents the row from being included in a neighborhood also including the row used to generate the group (such as, in the above example with reference to the sorted matrix in table 2, table 1 not being included in a neighborhood with table z if the corresponding row similarity metric is less than the row similarity threshold). The row similarity threshold may be similar to or the same as the similarity threshold described above with reference to block 518 in FIG. 5. In some implementations, the row similarity threshold is 0.90. However, any suitable row similarity threshold may be used, and the present disclosure is not limited to a specific threshold.

For an example, of a group of the first 21 rows of a matrix, if row 1 is found to be similar to rows 2, 4, 5, 8, and 10 (and not found to be similar to the other rows of the group), the system 100 may generate a neighborhood including the tables corresponding to rows 1, 2, 4, 5, 8, and 10. While not depicted in FIG. 7, the system 100 may keep track of which rows of the sorted matrix belong to a neighborhood. For example, the sorted matrix may include a column with, e.g., a binary flag to indicate whether the row has been assigned to a neighborhood, an indication as to which neighborhood the row is assigned, or otherwise to indicate that the row has been assigned to a neighborhood. In another example, such an indication may be a separate data object (such as a neighborhood map described above). When the system 100 includes a row in a neighborhood (such as including the corresponding table in the neighborhood), the system 100 may update the column, data object, etc. to indicate that the row is assigned to a neighborhood. For example, if rows 1, 2, 4, 5, 8, and 10 are added to a neighborhood, the system 100 keeps track of such rows being added to a neighborhood. In keeping track of which rows are already assigned to a neighborhood, when the operations of block 706 are to be performed again, the system 100 may skip over rows already included in a neighborhood. For the above example of rows 1, 2, 4, 5, 8, and 10 being included in a neighborhood, after performing the operations for row 1, the system 100 may proceed to row 2 in the matrix. Since row 2 is already assigned to a neighborhood, the system 100 may skip row 2 and thus proceed to row 3. In this manner, the operations in blocks 706-710 may be performed for row 3.

In some implementations, the n neighboring rows may be configured to exclude any rows not already included in a neighborhood. For example, if rows 1, 2, 4, 5, and 10 are already included in a neighborhood, the group of n rows subsequent to row 3 may exclude rows 4, 5, and 10. In some implementations, further rows may be included in the group to ensure the group size is constant (such as rows 24, 25, and 26 for row 3 in the above example with n equal to 20). In some other implementations, the rows to be excluded are not replaced in the group so that the group may be smaller but the range of rows for a group may remain constant (such as the group of rows for row 3 in the above example including rows 6-9 and 11-23). The similarity metric may be calculated between row 3 and each of the other rows of the group and compared to a threshold to attempt to generate a neighborhood including row 3. The operations of blocks 706-710 may repeat until the system 100 processes all of the sorted matrix in order to attempt to place each row into a neighborhood.

While not depicted in FIG. 7, the system 100 may also use data record information to determine if a neighborhood is valid. For example, extreme differences in creation dates (such as a decade), differences in S3 paths, or certain differences in Kafka topics may indicate that the tables of a neighborhood are not similar to each other. If the system 100 determines that some tables of a neighborhood are not similar to each other based on the data record information, the system 100 may disband the neighborhood. In some implementations, confirmation of the neighborhood using the data record information occurs during formation of the neighborhood. As such, the tables/rows that were to be included in the neighborhood may still be available for analysis for later rows of performing the operations in blocks 706-710 in FIG. 7.

Additionally or alternatively, while not depicted in FIG. 7, the data record information may be used to identify a master table for a neighborhood (such as described above). Identifying the master table may be the same as described above with reference to block 310 of operation 300 in FIG. 3. For example, a master table of a neighborhood may be the table having the greatest number of reads or the greatest number of reads and writes.

While the operations depicted in FIGS. 6 and 7 are described above as being a potential alternative of grouping and neighboring tables as compared to the operations depicted in FIGS. 4 and 5 (from which one or more master tables may be identified), in some implementations, the system 100 may use both approaches to generate neighborhoods and combine the neighbors in order to generate a final set of neighborhoods to be used to identify one or more master tables. For example, the system 100 may be configured to generate a first set of groups of tables using a plurality of bins (or multiple sets of groups using multiple pluralities of bins) and generate one or more neighborhoods from the one or more sets of groups of tables. The system may also be configured to generate a sorted matrix of the tables, group the tables based on the rows of the sorted matrix, and generate a set of neighborhoods from the groups generated based on the sorted matrix. In this manner, the system 100 generates two different sets of neighborhoods using the two different approaches.

The system 100 may combine the one or more neighborhoods (generated using the binning approach) and the first set of neighborhoods (generated using the sorted matrix approach) to generate the final one or more neighborhoods to be used to identify the one or more master tables. For example, the neighborhoods generated using the sorted matrix approach may be used as a check on the neighborhoods generated using the binning approach. The system 100 may compare the overlaps between the two different sets of neighborhoods. If there is not a threshold overlap of a neighborhood from the binning approach and any neighborhood from the sorted matrix approach, the system 100 may remove the neighborhood from being a final neighborhood to be used to identify a master table. Thus, remaining neighborhoods with sufficient overlap between the two approaches may be used as the final neighborhoods for identifying one or more master tables. In another example, neighborhoods may be adjusted to include only the intersection of neighborhoods from the two approaches. In this manner, only the overlap of tables occurring in both neighborhoods remains in a final neighborhood to be used to identify a master table. In a further example, neighborhoods may be adjusted to include a union of neighborhoods from the two approaches. In this manner, a neighborhood from the binning approach may be expanded based on an overlapping neighborhood from the sorted matrix approach. In some implementations, two neighborhoods or joined via a union only if the overlap between the neighborhoods is greater than a threshold number or percentage of tables as compared to the neighborhoods to be joined. While some examples of combining the two sets of neighborhoods are provided, any suitable means of combining the neighborhoods may be used, and the present disclosure is not limited to a specific implementation for combining the two sets of neighborhoods to generate the final neighborhoods to be used to identify the master tables.

To note, the system 100 may be configured to perform both approaches sequentially or concurrently. In some implementations, the system 100 may be configured to perform only one approach, be able to be switched between performing either approach or both approaches, or may be configured in any other suitable way to perform the operations described herein to generate the neighborhoods of computer readable tables and identify one or more master tables of the datalake based on the neighborhoods of computer readable tables.

As described above, a system may be implemented to automatically process computer readable tables of a datalake to cluster the tables into neighborhoods and to identify master tables in the datalake. In this manner, a user may be able to easily identify master tables to be used for future work without requiring significant time or resources in manually reviewing tables to find a master table (which may be a table of interest to generate a new table).

To note, any of the thresholds described herein that may be used by the system 100 (such as a threshold similarity metric, threshold number of tables, threshold number of vectors, threshold overlap, row similarity threshold, and so on) may be hyperparameters to be tuned to meet the objectives of a user or company to use the system 100. As such, the system 100 may be configured as appropriate for different requirements of different companies or even use cases for the same company to generate the neighborhoods.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles and the novel features disclosed herein.

What is claimed is:

1. A computer-implemented method for processing computer readable tables from a datalake in a computer memory, comprising:
    obtaining a plurality of computer readable tables of a datalake, wherein each computer readable table includes one or more features;
    generating, in the memory, a matrix to identify one or more master tables in the datalake, the matrix including:
        a plurality of rows, wherein each computer readable table of the plurality of computer readable tables is depicted in a unique row of the plurality of rows; and
        a plurality of columns, wherein for each row depicting a computer readable table, the plurality of columns depicts how many features the computer readable table includes;
    before identifying any master tables from the plurality of computer readable tables, organizing the matrix to group the plurality of computer readable tables into a plurality of groups based on how many features are included in each computer readable table of the plurality of computer readable tables;
    for each of one or more groups of the plurality of groups as organized in the matrix, generating one or more neighborhoods based on a similarity of features between computer readable tables of the group, wherein each neighborhood includes one or more computer readable tables of the group;
    for each neighborhood, identifying one or more master tables from the one or more computer readable tables of the group; and
    providing an indication of one or more master tables identified in the datalake.

2. The method of claim 1, wherein generating the rows of the matrix that depict the plurality of computer readable tables includes generating a vector from each of the plurality of computer readable tables, wherein for a computer readable table:
    each of the one or more features of the computer readable table is represented in a column of the computer readable table, wherein each column of the computer readable table is associated with a column name; and
    generating the vector is based on the column name of the one or more columns of the computer readable table.

3. The method of claim 2, wherein:
    each column of the computer readable table is also associated with a datatype; and
    generating the vector is based on a combination of the column name and the datatype associated with the one or more columns of the computer readable table.

4. The method of claim 2, wherein grouping the plurality of computer readable tables into the plurality of groups includes binning each of the plurality of computer readable tables into a bin of a first plurality of bins, wherein each bin of the first plurality of bins corresponds to a first range of number of columns depicting how many features are included in the computer readable table.

5. The method of claim 4, wherein grouping the plurality of computer readable tables into the plurality of groups includes binning each of the plurality of computer readable tables into a bin of a second plurality of bins, wherein:
    each bin of the second plurality of bins corresponds to a second range of number of columns depicting how many features are included in the computer readable table; and
    each of the second ranges is between consecutive ranges of the first ranges.

6. The method of claim 2, wherein generating the one or more neighborhoods includes:
    calculating a similarity metric between vectors for one or more pairs of corresponding computer readable tables of the group as organized in the matrix; and
    clustering the one or more computer readable tables of the group into the one or more neighborhoods based on the calculated similarity metrics.

7. The method of claim 6, wherein generating the one or more neighborhoods includes:
    creating, in the memory, a neighborhood map, wherein creating the neighborhood map includes, for each computer readable table of the group, setting an associated map entry of the neighborhood map to false;
    creating, in the memory, a similar table map;
    initializing, in the memory, an integer x and an integer y to a first value corresponding to a first computer readable table of the group;
    recursively performing the following operations for each computer readable table of the group:
        if a map entry of the neighborhood map associated with an x computer readable table is set to true, incrementing integer x;
        if the map entry of the neighborhood map associated with the x computer readable table is set to false, recursively performing the following operations until y is greater than a second value:
            if one or more of a map entry of the neighborhood map associated with a y computer readable table is set to true or x equals y, incrementing integer y; and
            if the map entry of the neighborhood map associated with the y computer readable table is set to false and x does not equal y:
                calculating a similarity metric between vectors associated with the x computer readable table and the y computer readable table;
                comparing the similarity metric to a similarity threshold;
                if the similarity metric is greater than the similarity threshold:
                    associating the y computer readable table to the x computer readable table in the similar tables map; and
                    setting the map entry of the neighborhood map associated with the x computer readable table to true;
                    setting the map entry of the neighborhood map associated with the y computer readable table to true; and
                incrementing integer y; and
        resetting integer y; and generating one or more neighborhoods of one or more computer readable tables based on the entries of the similar tables map.

8. The method of claim 6, wherein:
the matrix includes:
  a column for each column included in at least two computer readable tables of the plurality of computer readable tables; and
  a count column;
generating the matrix includes:
  excluding any column included in a computer readable table that is not included in at least one other computer readable table from being included as a column in the matrix; and
  populating each row of the matrix, wherein populating a row of the matrix associated with a computer readable table includes:
    entering a zero into each column entry of the row that is associated with a column not included in the computer readable table;
    entering a one into each column entry of the row that is associated with a column included in the computer readable table;
    aggregating a number of ones occurring in the row; and
    entering the aggregate into the count column entry of the row;
organizing the matrix includes sorting the matrix based on the count column; and
the method further includes:
  generating a first set of neighborhoods, including:
    calculating a row similarity metric between a first row of the matrix and each of n rows of the matrix above or below the first row for an integer n greater than or equal to 1; and
    for each row of the n rows of the matrix:
      adding the row to a neighborhood including the first row if the row is not included in another neighborhood and the row similarity metric is greater than a row similarity threshold; and
      preventing adding the row to the neighborhood including the first row if the row is included in another neighborhood or the row similarity metric is less than the row similarity threshold; and
  combining the one or more neighborhoods and the first set of neighborhoods to generate the one or more neighborhoods to be used to identify the one or more master tables.

9. The method of claim 8, further comprising:
for each neighborhood of the first set of neighborhoods, identifying at least one of a first set of master tables; and
combining the one or more master tables identified and the first set of master tables identified to generate the one or more master tables to be indicated.

10. The method of claim 6, wherein:
grouping the plurality of computer readable tables into the plurality of groups includes:
  binning each of the plurality of computer readable tables into a bin of a first plurality of bins, wherein each bin of the first plurality of bins corresponds to a first range of number of columns; and
  binning each of the plurality of computer readable tables into a bin of a second plurality of bins, wherein:
    each bin of the second plurality of bins corresponds to a second range of number of columns; and
    each of the second ranges is between consecutive ranges of the first ranges; and
generating the one or more neighborhoods includes:
  generating a first set of neighborhoods associated with the first plurality of bins;
  generating a second set of neighborhoods associated with the second plurality of bins; and
  combining the first set of neighborhoods and the second set of neighborhoods.

11. The method of claim 1, wherein:
the matrix includes:
  a column for each column included in at least two computer readable tables of the plurality of computer readable tables; and
  a count column;
generating the matrix includes:
  excluding any column included in a computer readable table that is not included in at least one other computer readable table from being included as a column in the matrix;
  populating each row of the matrix, wherein populating a row of the matrix associated with a computer readable table includes:
    entering a zero into each column entry of the row that is associated with a column not included in the computer readable table;
    entering a one into each column entry of the row that is associated with a column included in the computer readable table;
    aggregating a number of ones occurring in the row; and
    entering the aggregate into a count column entry of the row; and
grouping the plurality of computer readable tables into the plurality of groups includes grouping the plurality of computer readable tables based on the count column of the matrix.

12. The method of claim 11, wherein:
organizing the matrix includes sorting the matrix based on the count column; and
generating the one or more neighborhoods includes recursively performing the following operations for each row of the matrix not already included in any neighborhood:
  calculating a row similarity metric between the row of the matrix and each of n comparison rows of the matrix above or below the row of the matrix for an integer n greater than or equal to 1; and
  for each comparison row of the n comparison rows of the matrix:
    adding the comparison row to a neighborhood including the row of the matrix if the comparison row is not included in another neighborhood and the row similarity metric is greater than a row similarity threshold; and
    preventing adding the comparison row to the neighborhood including the first row if the comparison row is included in another neighborhood or the row similarity metric is less than the row similarity threshold.

13. The method of claim 1, wherein identifying the one or more master tables from the one or more computer readable tables of the group is based on:
data record information of each of the one or more computer readable tables of the neighborhood.

14. A system for processing computer readable tables in a datalake, the system comprising:
one or more processors; and
a memory storing instructions that, when executed by the one or more processors, causes the system to perform operations comprising:
obtaining a plurality of computer readable tables of a datalake, wherein each computer readable table includes one or more features;
generating, in the memory, a matrix to identify one or more master tables in the datalake, the matrix including:
a plurality of rows, wherein each computer readable table of the plurality of computer readable tables is depicted in a unique row of the plurality of rows; and
a plurality of columns, wherein for each row depicting a computer readable table, the plurality of columns depicts how many features the computer readable table includes;
before identifying any master tables from the plurality of computer readable tables, organizing the matrix to group the plurality of computer readable tables into a plurality of groups based on how many features are included in each computer readable table of the plurality of computer readable tables;
for each of one or more groups of the plurality of groups as organized in the matrix, generating one or more neighborhoods based on a similarity of features between computer readable tables of the group, wherein each neighborhood includes one or more computer readable tables of the group;
for each neighborhood, identifying one or more master tables from the one or more computer readable tables of the group; and
providing an indication of one or more master tables identified in the datalake.

15. The system of claim 14, wherein generating the rows of the matrix that depict the plurality of computer readable tables includes generating a vector from each of the plurality of computer readable tables, wherein for a computer readable table:
each of the one or more features of the computer readable table is represented in a column of the computer readable table, wherein each column of the computer readable table is associated with a column name and a datatype; and
generating the vector is based on a combination of the column name and the datatype associated with the one or more columns of the computer readable table.

16. The system of claim 15, wherein generating the one or more neighborhoods includes:
calculating a similarity metric between vectors for one or more pairs of corresponding computer readable tables of the group as organized in the matrix; and
clustering the one or more computer readable tables of the group into the one or more neighborhoods based on the calculated similarity metrics.

17. The system of claim 16, wherein generating the one or more neighborhoods includes:
creating, in the memory, a neighborhood map, wherein creating the neighborhood map includes, for each computer readable table of the group, setting an associated map entry of the neighborhood map to false;
creating, in the memory, a similar tables map;
initializing, in the memory, an integer x and an integer y to a first value corresponding to a first computer readable table of the group;
recursively performing the following operations for each computer readable table of the group:
if a map entry of the neighborhood map associated with an x computer readable table is set to true, incrementing integer x;
if the map entry of the neighborhood map associated with the x computer readable table is set to false, recursively performing the following operations until y is greater than the second value:
if one or more of a map entry of the neighborhood map associated with a y computer readable table is set to true or x equals y, incrementing integer y; and
if the map entry of the neighborhood map associated with the y computer readable table is set to false and x does not equal y:
calculating a similarity metric between vectors associated with the x computer readable table and the y computer readable table;
comparing the similarity metric to a similarity threshold;
if the similarity metric is greater than the similarity threshold:
associating the y computer readable table to the x computer readable table in the similar tables map; and
setting the map entry of the neighborhood map associated with the x computer readable table to true;
setting the map entry of the neighborhood map associated with the y computer readable table to true; and
incrementing integer y; and
resetting integer y; and
generating one or more neighborhoods of one or more computer readable tables based on the entries of the similar tables map.

18. The system of claim 17, wherein:
the matrix includes:
a column for each column included in at least two computer readable tables of the plurality of computer readable tables; and
a count column;
generating the matrix includes:
excluding any column included in a computer readable table that is not included in at least one other computer readable table from being included as a column in the matrix; and
populating each row of the matrix, wherein populating a row of the matrix associated with a computer readable table includes:
entering a zero into each column entry of the row that is associated with a column not included in the computer readable table;
entering a one into each column entry of the row that is associated with a column included in the computer readable table;
aggregating a number of ones occurring in the row; and
entering the aggregate into a count column entry of the row;
organizing the matrix includes sorting the matrix based on the count column; and the method further includes:
    generating a first set of neighborhoods, including:
        calculating a row similarity metric between a first row of the matrix and each of n rows of the matrix above or below the first row for an integer n greater than or equal to 1; and
        for each row of the n rows of the matrix:
            adding the row to a neighborhood including the first row if the row is not included in another neighborhood and the row similarity metric is greater than a row similarity threshold; and
            preventing adding the row to the neighborhood including the first row if the row is included in another neighborhood or the row similarity metric is less than the row similarity threshold; and
    combining the one or more neighborhoods and the first set of neighborhoods to generate the one or more neighborhoods to be used to identify the one or more master tables.

19. The system of claim 18, wherein the operations further comprise:
    for each neighborhood of the first set of neighborhoods, identifying at least one of a first set of master tables; and
    combining the one or more master tables identified and the first set of master tables identified to generate the one or more master tables to be indicated.

20. The system of claim 14, wherein:
    the matrix includes:
        a column for each column included in at least two computer readable tables of the plurality of computer readable tables; and
        a count column;
    generating the matrix includes:
        excluding any column included in a computer readable table that is not included in at least one other computer readable table from being included as a column in the matrix; and
        populating each row of the matrix, wherein populating a row of the matrix associated with a computer readable table includes:
            entering a zero into each column entry of the row that is associated with a column not included in the computer readable table;
            entering a one into each column entry of the row that is associated with a column included in the computer readable table;
            aggregating a number of ones occurring in the row; and
            entering the aggregate into a count column entry of the row;
    grouping the plurality of computer readable tables into the plurality of groups includes grouping the plurality of computer readable tables based on the count column of the matrix; and
    generating the one or more neighborhoods includes:
        sorting the matrix based on the count column; and
        recursively performing the following operations for each row of the matrix not already included in any neighborhood of the first set of neighborhoods:
            calculating a row similarity metric between the row of the matrix and each of n comparison rows of the matrix above or below the row of the matrix for an integer n greater than or equal to 1; and
            for each comparison row of the n comparison rows of the matrix:
                adding the comparison row to a neighborhood including the row of the matrix if the comparison row is not included in another neighborhood and the row similarity metric is greater than a row similarity threshold; and
                preventing adding the comparison row to the neighborhood including the first row if the comparison row is included in another neighborhood or the row similarity metric is less than the row similarity threshold.

\* \* \* \* \*